(12) United States Patent
Choma

(10) Patent No.: US 10,994,468 B2
(45) Date of Patent: May 4, 2021

(54) FOLDABLE COMPOSITE STRUCTURES

(71) Applicant: CLEMSON UNIVERSITY, Clemson, SC (US)

(72) Inventor: Joseph Choma, Greer, SC (US)

(73) Assignee: Clemson University Research Foundation, Clemson, SC (US)

(*) Notice: Subject to any disclaimer, the term of this patent is extended or adjusted under 35 U.S.C. 154(b) by 0 days.

(21) Appl. No.: 16/381,653

(22) Filed: Apr. 11, 2019

(65) Prior Publication Data

US 2019/0315045 A1 Oct. 17, 2019

Related U.S. Application Data

(60) Provisional application No. 62/655,978, filed on Apr. 11, 2018.

(51) Int. Cl.
*B29C 53/06* (2006.01)
*B29C 59/00* (2006.01)
(Continued)

(52) U.S. Cl.
CPC ........... *B29C 53/06* (2013.01); *B05D 1/32* (2013.01); *B29C 59/007* (2013.01); *B29C 70/30* (2013.01);
(Continued)

(58) Field of Classification Search
None
See application file for complete search history.

(56) References Cited

U.S. PATENT DOCUMENTS 3,972,764 A * 8/1976 Sendor .................. B42D 3/02
156/243
3,978,255 A 8/1976 Smith
(Continued)

FOREIGN PATENT DOCUMENTS

| CN | 104690969 | 6/2015 |
| CN | 105313346 | 2/2016 |

(Continued)

OTHER PUBLICATIONS

Block, et al. "Three-dimensional funicular analysis of masonry vaults" *Mechanics Research Communications* 56 (2014) pp. 53-60.
(Continued)

*Primary Examiner* — Barbara J Musser
(74) *Attorney, Agent, or Firm* — Dority & Manning, P.A.

(57) ABSTRACT

Foldable composite structures and methods for fabricating foldable composite structures are provided. For example, a method comprises selectively applying a rigidifying substance to a sheet of composite material to define a plurality of hinges; allowing the rigidifying substance to cure; and folding the sheet of composite material along the hinges to form the composite structure. As another example, a method comprises laying out flat a sheet of composite material; masking a plurality of hinges on the sheet; applying a polymer to a sheet face; curing the polymer; removing the masking; and folding the sheet along the hinges to form the composite structure. An exemplary foldable composite structure comprises a planar sheet of composite material folded to define a plurality of surface segments and a plurality of hinges. A portion of the hinges form peaks and the remainder of the hinges form valleys. The hinges are defined between adjacent surface segments.

19 Claims, 30 Drawing Sheets

(51) Int. Cl.

| | |
|---|---|
| *B29C 70/30* | (2006.01) |
| *B05D 1/32* | (2006.01) |
| *E04C 3/34* | (2006.01) |
| *B32B 27/08* | (2006.01) |
| *B32B 27/20* | (2006.01) |
| *B32B 7/08* | (2019.01) |
| *B29L 7/00* | (2006.01) |
| *B32B 27/38* | (2006.01) |
| *B29L 31/10* | (2006.01) |
| *E04C 3/28* | (2006.01) |
| *E04C 3/29* | (2006.01) |

(52) U.S. Cl.
CPC ........... *E04C 3/34* (2013.01); *B29L 2007/001* (2013.01); *B29L 2031/10* (2013.01); *B32B 7/08* (2013.01); *B32B 27/08* (2013.01); *B32B 27/20* (2013.01); *B32B 27/38* (2013.01); *B32B 2250/02* (2013.01); *B32B 2260/046* (2013.01); *E04C 3/28* (2013.01); *E04C 3/29* (2013.01)

(56) References Cited

U.S. PATENT DOCUMENTS

| | | | |
|---|---|---|---|
| 5,644,322 A | | 7/1997 | Hayes et al. |
| 7,713,893 B2 | | 5/2010 | Goering |
| 9,205,629 B2 | | 12/2015 | Livingston-Peters et al. |
| 2009/0068365 A1* | | 3/2009 | Obermeyer ............. B29C 65/02 427/385.5 |
| 2017/0021565 A1* | | 1/2017 | Deaville ............... B29C 70/382 |
| 2018/0282499 A1* | | 10/2018 | Hosoda ....................... C08J 5/24 |
| 2019/0240875 A1* | | 8/2019 | Bomphray .......... B29C 35/0266 |

FOREIGN PATENT DOCUMENTS

| | | |
|---|---|---|
| CN | 205778247 | 12/2016 |
| DE | 102012018836 | 3/2014 |
| JP | 2009-034941 | 2/2009 |
| KR | 101668955 | 10/2016 |

OTHER PUBLICATIONS

Calladine, C.R. "Theory of Shell Structures" *Cambridge University Press* (1983).
Demaine, et al. "Origamizer: A Practical Algorithm for Folding Any Polyhedron" *Intl Symp Comput Geom* 34 (2017) pp. 1-16.
Demaine, et al. "History of Curved Origami Sculpture" (2015) http://erikdemaine.org/curved/history/.
Demaine, et al. "Curved Crease Folding: A Review on Art, Design and Mathematics" *Proceedings of the IABSE-LASS Symposium: Taller, Longer, Lighter* (2011) pp. 1-8.
Dewey, J. "Art as Experience" *Minton, Balch & Company* (1934).
Dyson, F.J. "Two Revolutions in Astronomy" *Proc Amer Phil Soc* 140(1) (1996) pp. 1-9. (Abstract only).
Gardiner, G. "Carbon-Kevlar Hinge" *CompositesWorld* (2017). https://www.compositesworld.com/blog/post/carbon-kevlar-hinge-.
Gardiner, G. "Reconfigurable Tooling: Revolutionizing Composites Manufacturing" *CompositesWorld* (2017). https://www.compositesworld.com/articles/reconfigurable-tooling-revolutionizing-composites-manufacturing.
Glanville, R. "Researching design and designing research" *Design Issues* 15(2) (1999) pp. 80-91.
Gross, M.D. "Design as Exploring Constraints" *Mass Instit Techn* (1985) pp. 1-147.
Hai, et al. "Structural behavior of hybrid FRP composite I-beam" *Constr Bldg Mater* 24(6) (2010) pp. 956-969.
Kaltenbach, F. "ICD/ITKE Research Pavilion 2017: Drones and Robots, Hand in Hand." *Detail* (2017). https://www.detail.de/artikel/icditke-research-pavilion-2017-drohnen-und-roboter-hand-in-hand-30142/.
Klee, P. "Pedagogical Sketchbook" *Faber and Faber Limited* (1953).
Koschitz, D. "Frei Otto, 1925-2015" *The Architect's Newspaper* (2015). https://archpaper.com/2015/05/frei-otto-1925-2015/.
Koschitz, et al. "Curved Crease Origami" *Advances in Architectural Geometry* (2008) pp. 29-32.
Kreysler, et al. "Guidelines and Recommended Practices for Fiber-Reinforced-Polymer Architectural Products" *American Composites Manufacturers Association* (2016).
Lang, R.J. "Origami design secrets: mathematical methods for an ancient art" *AK Peters/CRC Press* (2003).
Schön, D.A. "The Reflective Practitioner: How Professionals Think in Action" *Basic Books* (1983).
Šekularac, et al. "Folded structures in modem architecture." *Architecture and Civil Engineering* 10(1) (2012) pp. 1-16.
Shelden, D.R. "Digital Surface Representation and the Constructibility of Gehry's Architecture" *Mass Instit Techn* (2002).
Venturi, R. "Complexity and Contradiction in Architecture" *Museum of Modern Art* (1966).
Von Foerster, H. "Understanding Understanding: Essays on Cybernetics and Cognition" *Springer* (2003).

\* cited by examiner

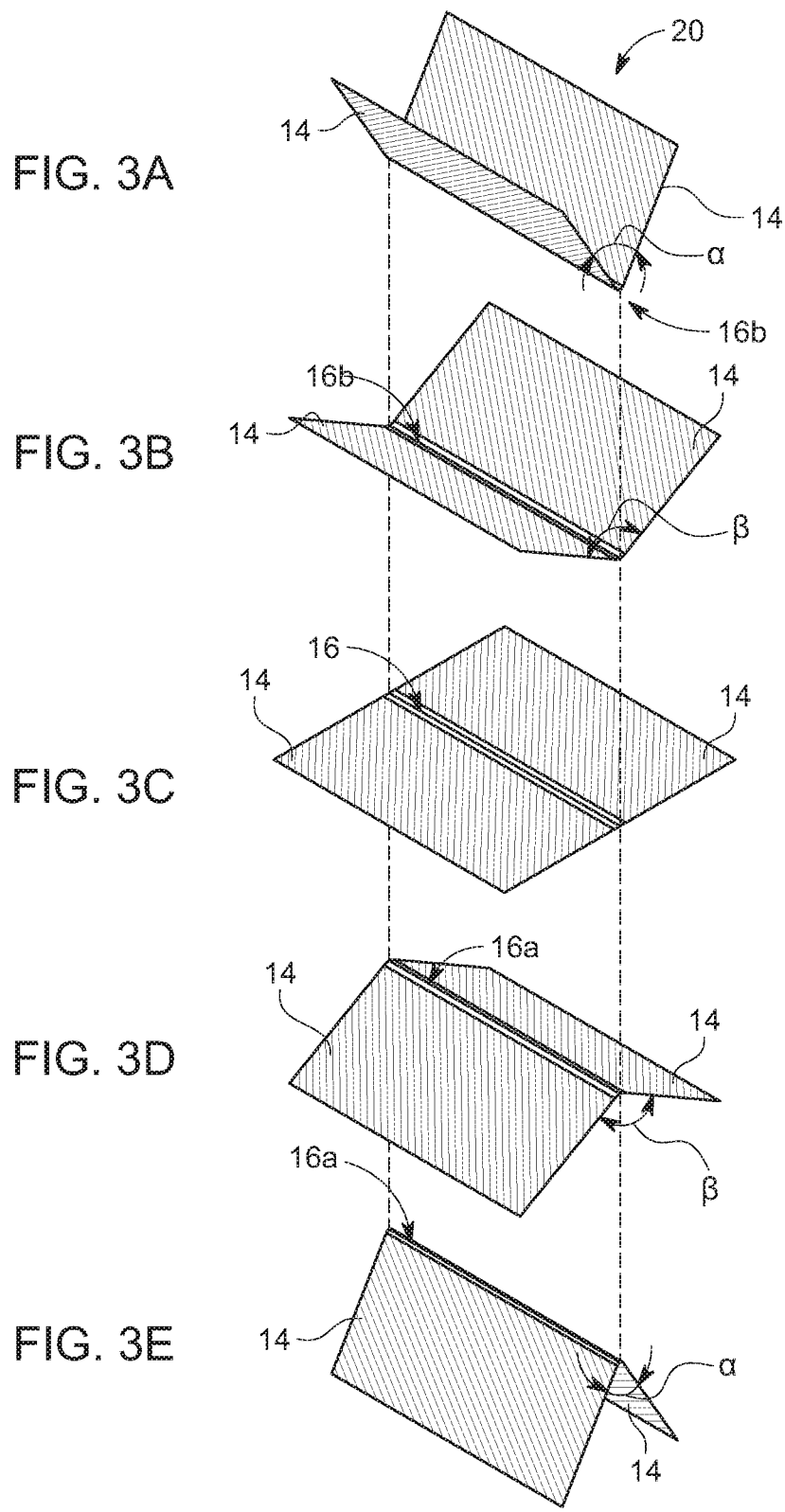

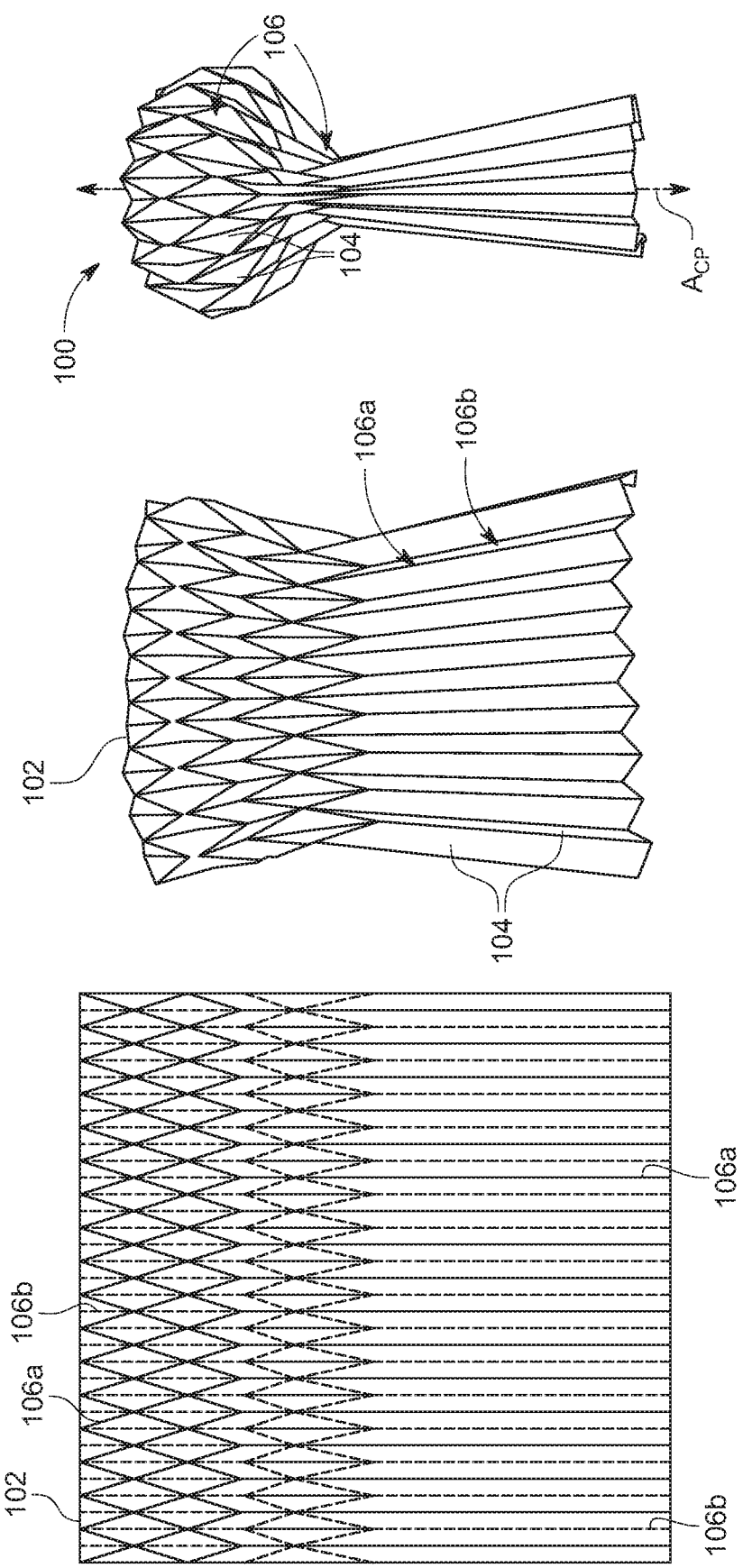

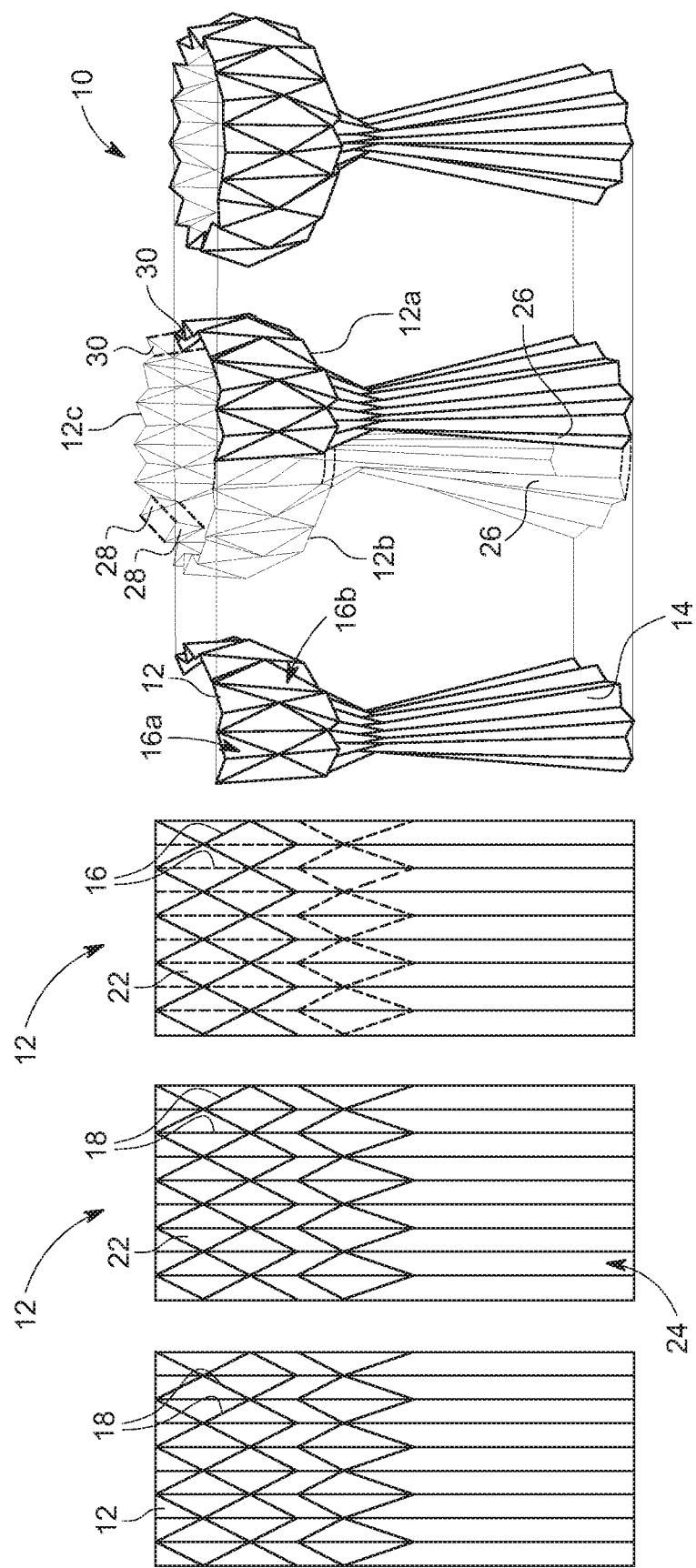

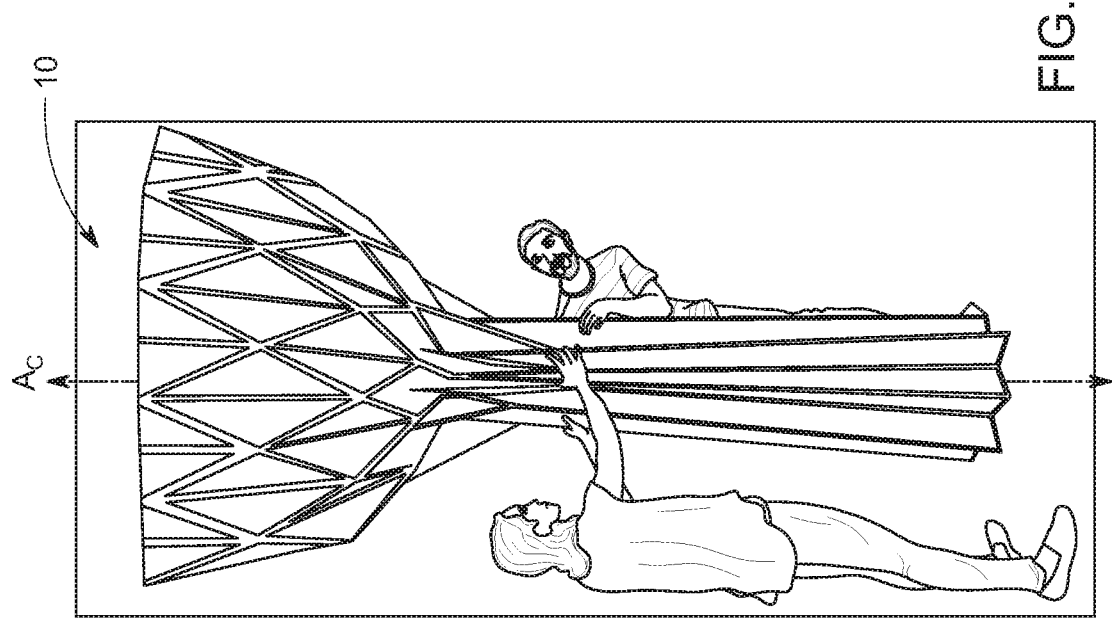
FIG. 7I
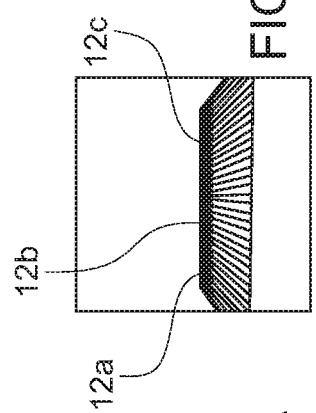
FIG. 7E
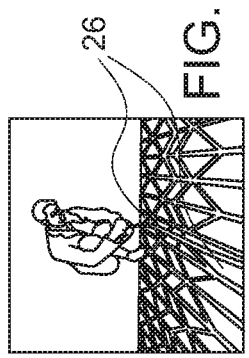
FIG. 7F
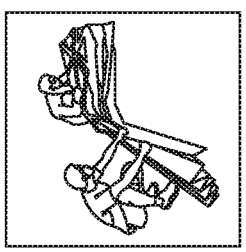
FIG. 7G
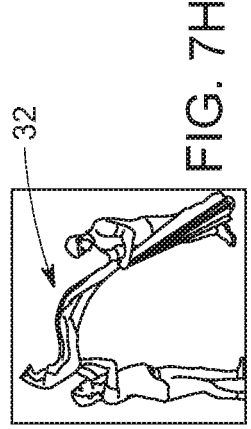
FIG. 7H
FIG. 7A
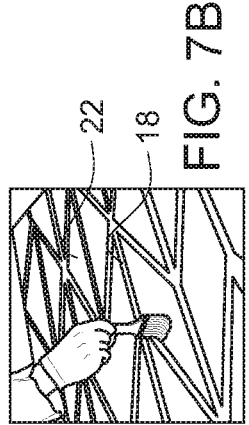
FIG. 7B
FIG. 7C
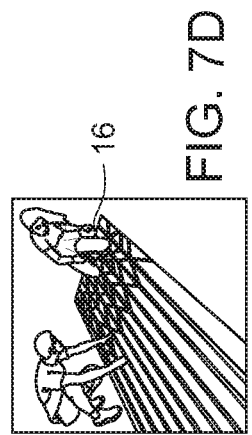
FIG. 7D

FOLDABLE COMPOSITE STRUCTURES

CROSS-REFERENCE TO RELATED APPLICATIONS

The present application claims priority to U.S. Provisional Application Ser. No. 62/655,978, filed on Apr. 11, 2018, which is incorporated herein in its entirety by reference thereto.

FIELD

The present subject matter relates generally to composite structures. More particularly, the present subject matter relates to foldable composite structures and methods of fabricating composite structures by folding a composite material.

BACKGROUND

With the recent inclusion of fiber-reinforced-polymer (FRP) construction in the International Building Code (IBC), textile-based composites are now recognized as viable building materials. Additionally, the Architectural Division of the American Composites Manufacturers Association (ACMA) has produced Guidelines and Recommended Practices for Fiber-Reinforced-Polymer Architectural Products. Currently, the IBC and ACMA guides dominantly focus on FRP as cladding systems. However, major advances in fire retardant performance suggests that FRP will likely become a primary building material in architectural applications, i.e., that FRP will move beyond secondary building components and into structural applications. Therefore, a need exists to identify structural logic that flows from or is compatible with FRP's material logic, i.e., to identify structural or product designs that take advantage of FRP's unique characteristics. Moreover, beyond the potential structural applications, improved manufacturing methods for FRP parts and structures would be useful.

Commonly, FRP is formed from glass or carbon fibers embedded in a polymer matrix, although other materials also may be used as fiber reinforcement of the polymer. Often, FRP components begin as a roll of fabric, resin, and a catalyst, and because fiberglass and carbon fiber parts begin as a surface (roll of fabric), it seems appropriate to develop a systemic way of thinking about the material through a surface logic. Paper is also a fibrous material and surface. When a sheet of paper is folded, e.g., in a series of accordion folds, the planar material with minimal thickness is transformed into a three dimensional (3D) surface with structural depth. In this instance, folding is used to add structural properties to the surface. When the series of accordion folds are compressed together, the entire structure can be flat-packed, making the structure significantly easier to transport and deploy. Additionally, it is possible to make almost any shape with folding; therefore, it is possible to create numerous variations through one systemic process, i.e., folding, rather than through the use of many tools or other apparatus, e.g., molds.

Accordingly, a technique to allow composite materials such as FRP to fold like paper through an economical means, without the need of any molds, would be useful. Further, foldable composite structures that can be condensed into and/or transported in a planar state would be beneficial. Additionally, foldable composite structures that can be transformed from a planar state into a three-dimensional state and then returned to the planar state would be advantageous.

BRIEF DESCRIPTION

Aspects and advantages of the invention will be set forth in part in the following description, or may be obvious from the description, or may be learned through practice of the invention.

In one exemplary embodiment of the present subject matter, a method for fabricating a composite structure is provided. The method comprises selectively applying a polymer to a sheet of composite material to define a plurality of hinges; allowing the polymer to cure; and folding the sheet of composite material along the hinges to form the composite structure.

In another exemplary embodiment of the present subject matter, a method for fabricating a composite structure is provided. The method comprises laying out flat a sheet of composite material; masking a plurality of locations of hinges on the sheet of composite material using a masking material; applying a polymer to a face of the sheet of composite material; curing the polymer; removing the masking material; and folding the sheet of composite material along the hinges to form the composite structure.

In a further exemplary embodiment of the present subject matter, a composite structure is provided. The composite structure comprises a planar sheet of composite material folded to define a plurality of surface segments and a plurality of hinges. A portion of the hinges form peaks and the remainder of the hinges form valleys. The hinges are defined between adjacent surface segments.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 3A-3E illustrate the portion of the composite structure of FIG. 2 folded in a variety of configurations, according to an exemplary embodiment of the present subject matter.

FIGS. 4A-4C provide different views of a paper model of the composite structure of FIG. 1.

FIGS. 5A-5D provide different schematic views of the column structure of FIG. 1 and illustrates a method for forming the column structure, according to an exemplary embodiment of the present subject matter.

FIGS. 7A-7I illustrate a method for forming the column structure of FIG. 1, according to an exemplary embodiment of the present subject matter.

DETAILED DESCRIPTION

Figure 1:
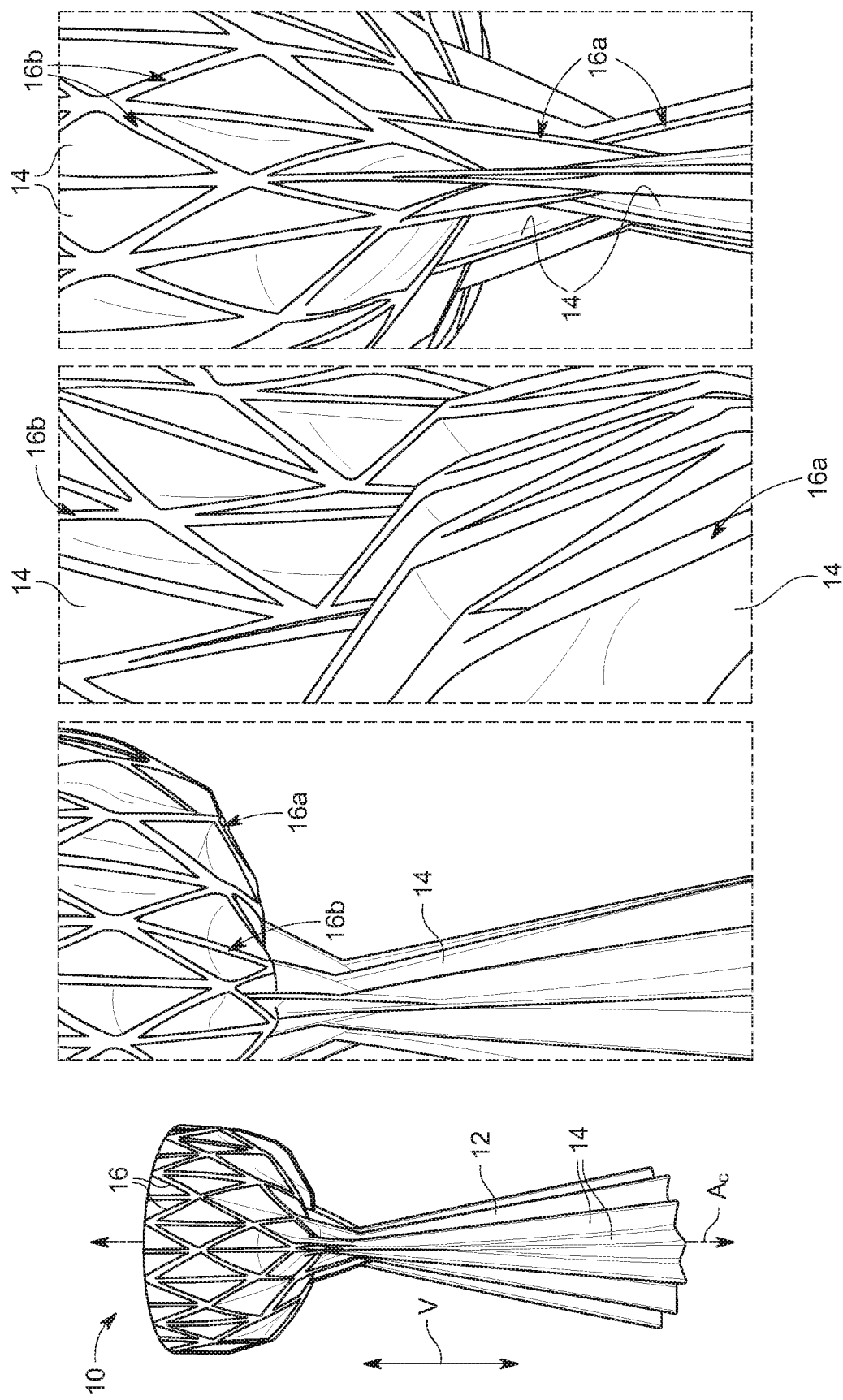
FIG. 1 provides different views of a column structure formed by folding at least one generally flat or planar sheet of composite material, according to an exemplary embodiment of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present subject matter is directed to exemplary processes that allow composite materials such as fiber-reinforced-polymer (FRP) to fold, e.g., like paper, and to exemplary foldable composite structures. For example, by selectively coating resin on a dry fiber reinforcement fabric (e.g., a fiberglass cloth), parts can fold along the uncoated portion of the cloth to form a three dimensional (3D) composite structure. The selective coating and folding technique eliminates the need for any molds or fasteners to fabricate and construct the composite structure, while allowing for numerous variations and flat-packing capabilities. Further, exemplary foldable composite structures as described herein can transform from a flat-packed or planar state to a 3D state, and then return to the planar state for transportation, storage, etc.

Referring now to the drawings, wherein identical numerals indicate the same elements throughout the figures, FIG. 1 provides several views of an exemplary column structure 10 fabricated from one or more generally flat or planar sheets 12 of composite material. The composite material may be a textile-based composite such as a fiber-reinforced-polymer (FRP), where the reinforcing fibers are glass, carbon, or any other suitable reinforcing material. As shown in FIG. 1, the column structure 10 comprises a plurality of surface segments 14 with hinges 16 between adjacent surface segments 14. The depicted surface segments 14 are generally planar and define surfaces of the column structure 10 between the hinges 16. The hinges 16 form either peaks 16a or valleys 16b. Each peak 16a projects away from a central axis $A_C$ of the column structure 10, and each valley 16b projects toward the central axis $A_C$. The central axis $A_C$ extends along or parallel to a vertical direction V defined by the column structure 10.

Figure 2:
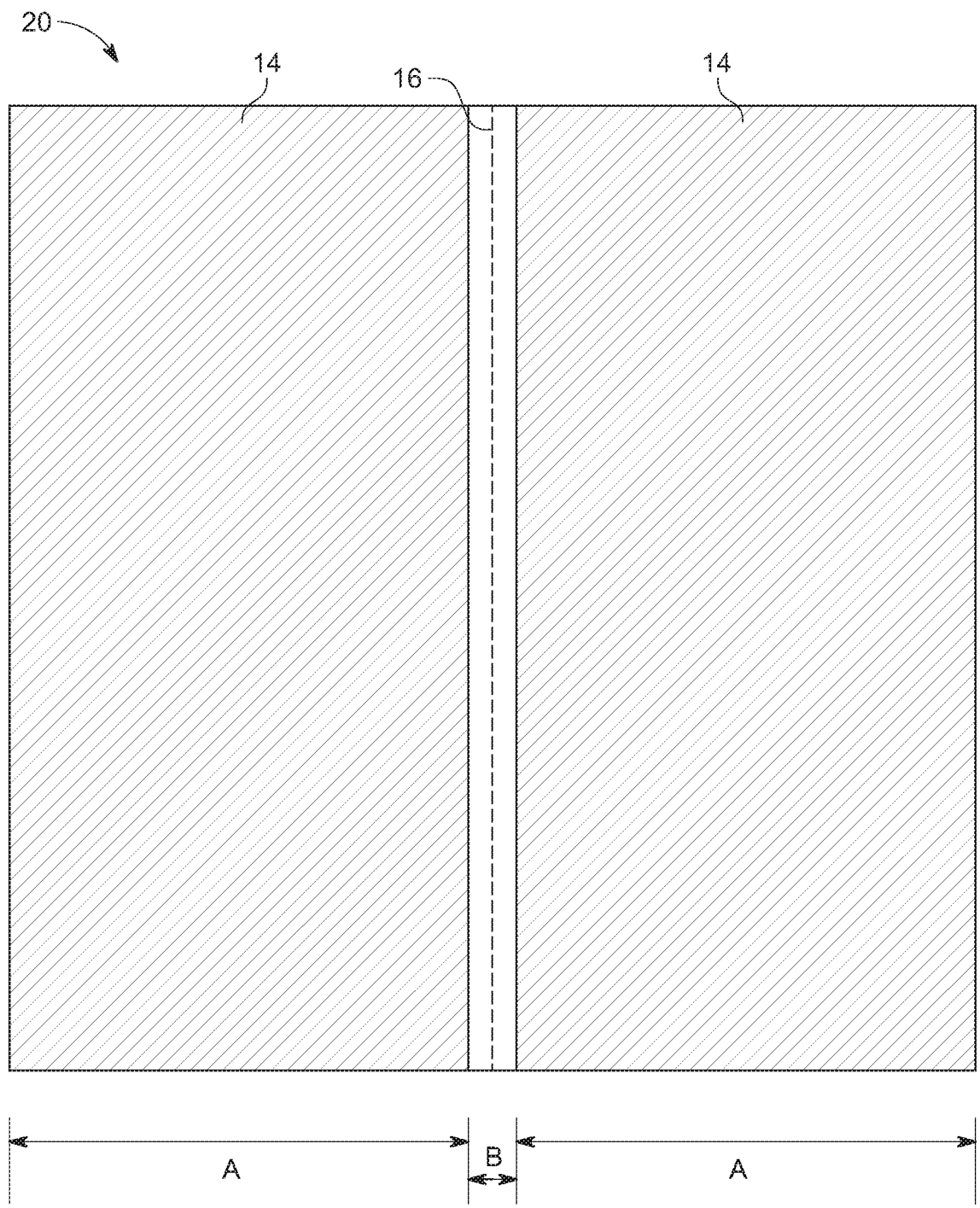
FIG. 2 illustrates a portion of a composite structure, including planar surface segments joined by a hinge, according to an exemplary embodiment of the present subject matter.

The column structure 10 depicted in FIG. 1 is fabricated by folding the one or more sheets 12 of composite material along the hinges 16 to form the surface segments 14. FIG. 2 illustrates a portion 20 of an exemplary composite structure comprising two surface segments 14 and a hinge 16. As shown in FIG. 2, the hinge 16 separates adjacent surface segments 14, and the surface segments 14 have a width A and the hinge has a width B; the width B is smaller than the width A. Generally, the surface segments 14 and hinges 16 are dimensioned such that the width B is less than the width A but greater than the thickness of the sheet 12 of composite material, i.e., greater than the material thickness of the hinge 16. The surface segments 14 shown in FIG. 2 also have a rectangular shape, but in the embodiment of FIG. 1, the surface segments 14 have a triangular shape. In exemplary embodiments, the surface segments 14 of a structure such as column 10 may not all have the same width and/or may not all have the same shape, but the hinges 16 may all have the same width B. Of course, in some embodiments, the width of the hinges 16 may vary throughout the structure, and as depicted in FIG. 1, although the surface segments 14 may have the same shape, the size (i.e., the area) of the surface segments 14 may vary throughout the structure. Other variations of size and shape in the surface segments 14 and hinges 16 also may occur in embodiments of the present subject matter.

As illustrated in FIG. 3, the portion 20 of the composite structure shown in FIG. 2 may be folded along the hinge in several different ways. The image (A) in FIG. 3 illustrates the hinge 16 forming a relatively steep valley 16b; the portion 20 is folded along the hinge 16 such that an acute first angle α is defined between the surface segments 14. In the image (B) in FIG. 3, the hinge 16 forms a shallower or less steep valley 16b; the portion 20 is folded along the hinge 16 such that an obtuse second angle β is defined between the surface segments 14. The image (C) is the same as FIG. 2; the portion 20 is not folded, such that the surface segments 14 and hinge 16 form one planar portion 20. Image (D) is generally the inverse of image (B); the portion 20 is folded along the hinge 16 such that the hinge 16 forms a low peak 16a, with the second angle β defined between the surface segments 14. Similarly, image (E) is generally the inverse of image (A); the portion 20 is folded along the hinge 16 such that the hinge 16 forms a high or steep peak 16a, with the first angle α defined between the surface segments 14.

As further described herein, during the process of forming the composite structure, the surface segments 14 and hinges 16 may be infused with a resin or coated with a polymer or other coating or rigidifying substance. For example, the surface segments 14 may be infused with a resin while the sheet 12 of composite material is laying substantially flat, which is allowed to cure before the sheet 12 is folded to form the composite structure. The resin may be configured to cure at ambient conditions (i.e., ambient temperature and pressure), at an elevated temperature or pressure, or upon exposure to a condition such as ultraviolet (UV) light, such as sunlight. The resin provides rigidity to the surface segments 14, thereby providing rigidity to the composite structure upon folding. In some embodiments, the hinges 16 are left dry prior to folding, i.e., the hinges 16 are not infused with the resin or coated with a coating before the sheet 12 is folded into the composite structure; the hinges 16 may be infused or coated once the sheet 12 has been folded and the composite structure has been erected or deployed. In other embodiments, the hinges 16 are infused with a b-stage resin while the sheet 12 of composite material is laying substantially flat. The b-stage resin cures when exposed to UV light or heat (i.e., at an elevated or a specific temperature). More particularly, prior to curing the b-stage resin, the hinges 16 would remain flexible. After the sheet 12 is folded into the composite structure, UV light or heat would cure the b-stage resin at the hinges 16, thereby rigidifying the entire structure as the surface segments 14 were previously rigidified with the curing of the resin. In still other embodiments, the hinges 16 may be coated with silicone or the like prior to folding the sheet 12; a coating such as silicone allows the hinges 16 to remain flexible, such that the sheet 12 can be folded along the hinges 16, while providing protection from, e.g., the natural elements (water, sunlight, etc.). Thus, one or more coatings may be selectively applied to the sheet 12 prior to folding, e.g., a first coating is selectively applied to the surface segments 14 while the hinges 16 remain uncoated or a second coating is selectively applied to the hinges 16. Moreover, after the sheet 12 is folded and the composite structure is erected or deployed, the entire composite structure may be coated with one or more finish coatings, which may be applied over any coatings that were applied to the sheet 12 prior to folding. The finish coating(s) may be selected to impart additional rigidity or strength to the composite structure, to provide protection from the elements (water, sunlight, etc.), or to impart other desirable characteristics to the composite structure. In other embodiments, the one or more finish coatings may be selectively applied to the composite structure, i.e., one or more selected areas of the composite structure, rather than the entire composite structure, may be coated with the one or more finish coatings.

It will be appreciated that the portion 20 of a composite structure illustrated in FIGS. 2 and 3 is only an example of adjacent surface segments 14 separated by a hinge 16 and the folds that may be made along the hinge 16. Many different variations in size, shape, hinge location, relative pitch of the surface segments 14 when folded, etc. of the portion 20 may be used in a composite structure to achieve the desired 3D shape, flat-packing configuration, structural capabilities, or the like of the composite structure.

Turning to FIGS. 4 through 7, the column structure 10 shown in FIG. 1, and an exemplary method for fabricating the column structure 10, will be described in greater detail. FIG. 4 depicts a paper model 100 of the column structure 10, which shows how the sheet of composite material 12 can be folded like paper using the methods described herein. As shown in image (A) of FIG. 4, a series of hinges 106, including peaks 106a and valleys 106b, can be indicated or marked on a sheet of paper 102. Then, referring to image (B), the sheet of paper 102 can be folded along the marked hinges 106 to define a plurality of surface segments 104. Adjacent surface segments 104 are separated by a hinge 106. Next, as shown in image (C), the sheet of paper 102 is wrapped around a central axis $A_{CP}$ of the paper model 100 to define a columnar paper model 100. Thus, by folding the sheet 102, a 3D object (paper model 100) is generated from the flat sheet of paper 102.

Figure 6A:
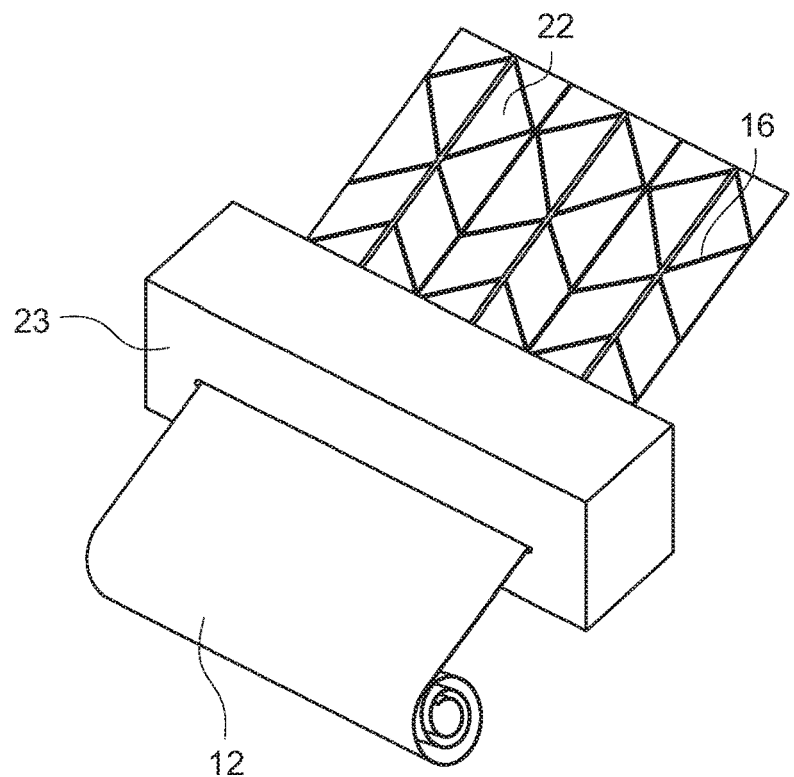
FIG. 6A provides a schematic view of a printer automatically applying a rigidifying substance, such as a resin, to a composite material, according to an exemplary embodiment of the present subject matter.
Figure 6B:
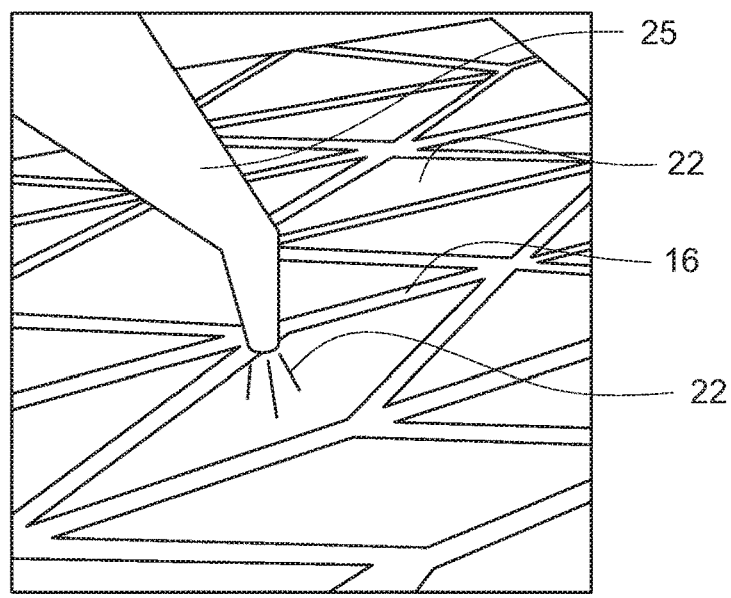
FIG. 6B provides a schematic view of an automated machine having a robotic arm applying a rigidifying substance, such as a resin, to a composite material, according to an exemplary embodiment of the present subject matter.

FIG. 5 illustrates an exemplary method for forming the composite column structure 10, which is similar to the method depicted in FIG. 4 for forming the paper model 100. First, as shown in image (A) of FIG. 5, a composite material is selected, such as a fabric FRP reinforced with glass or carbon fiber (e.g., a woven fiberglass material). A sheet 12 of the composite material is laid flat, i.e., in a planar configuration, and a fold design or pattern is marked on the sheet 12. More particularly, the location of each crease or hinge 16, along which the sheet 12 will be folded, is marked on the sheet 12. Next, as illustrated in image (B) of FIG. 5, a polymer 22 such as a resin is applied to the sheet 12. Preferably, the polymer 22 is selectively applied to the sheet 12. For example, the polymer 22 is not applied at the hinge locations, which facilitates folding of the sheet 12 because the sheet 12 of composite material remains flexible where the polymer 22 has not been applied. In some embodiments, the locations of the hinges 16 are masked with a masking material 18, such as tape or the like. The masking material 18 prevents the polymer 22 from coating the hinges 16, helping to ensure selective application of the polymer 22 and thereby allowing the hinges 16 to retain flexibility for folding the composite material sheet 12 along the hinges 16. In other embodiments, the location of each crease or hinge 16 need not be marked on the composite material and/or the hinge locations need not be masked with a masking material 18. For instance, in some embodiments, inkjet and/or roller printing technology or other automated application means may be used to selectively apply the polymer 22 to the composite material, e.g., similar to the way inks or the like are applied in patterns to textiles. As an example, referring to FIG. 6A, the sheet 12 of composite material, which may have a relatively long length such that the sheet 12 is rolled up to form a roll of the composite material, may be inserted or fed into an inkjet printer or a roller printer, which selectively applies the polymer 22 to the composite material via a printing head or roller, e.g., according to a preselected or programmed pattern. As another example, an automated machine having a robotic arm 25, such as shown in FIG. 6B, may selectively apply the polymer 22 to the sheet 12 of composite material, e.g., using a spray nozzle, an applicator gripped by or attached to the robotic arm 25, etc. However, some embodiments utilizing such printing or robotic technology, or other means for automating the application of the polymer 22 to the composite material, still may use a masking material 18 to mask one or more areas of the composite material.

In will be appreciated that the automated machine having the robotic arm 25 may be, e.g., an articulated or 6-axis industrial type robot, a dual arm robot, a SCARA robot, a Cartesian or gantry robot, a parallel or delta robot, a cylindrical robot, a redundant robot, or the like, as well as a mobile robot or manipulator, or any other suitable automated machine. In an exemplary embodiment, the automated machine includes a control circuit having one or more processors and associated memory device(s) configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

In exemplary embodiments, the rigidifying substance or polymer 22 is applied in an even layer to a face 24 of the sheet 12 until the polymer 22 penetrates a back side (not shown) of the sheet 12 that is opposite the face 24, and the polymer 22 is allowed to cure. In some embodiments, the polymer 22 cures over a period of time at ambient temperature and pressure, but in other embodiments, the sheet 12 may be cured for a period of time at an elevated temperature and/or pressure, e.g., in an oven or a pressurized oven, or by radiation, e.g., through the application of ultraviolet (UV) or electron beam (EB) energy sources to the polymer 22. In embodiments in which the polymer 22 is applied using a printer, robotic arm, or similar automated application means, such as an inkjet or roller printer 23 or automated robotic arm 25 as previously described, the curing means may be incorporated into the automated applicator, e.g., into the printer head or roller or into the robotic arm. It will be appreciated that the polymer 22 generally is applied to the entire area of the sheet 12 except for the portions of the sheet 12 along which the sheet 12 will be folded, i.e., the hinge locations, which may be avoided during application of the polymer 52 or covered by the masking material 48 to prevent application of the polymer 52 thereon. Further, as previously described, in some embodiments a coating such as a b-stage resin, silicone, or the like may be selectively applied to the hinges 16 prior to folding, which allows the hinges 16 to remain flexible enough for folding but imparts one or more desirable characteristics to the composite material at the hinge locations. Further, it will be appreciated that, utilizing an automated application means, the one or more coatings, such as the polymer or resin 22, may be applied as described with respect to FIG. 2. For example, the portions of the composite material defining the surface segments 14 may be infused by the automated application means, such as printer 23 or robotic arm 25, with a rigidifying substance 22 that cures over time while the portions of the composite material defining the hinges 16 may be infused by the automated applications means with a b-stage resin or the like that cures under specific conditions, such as the application of UV light or a specific temperature. Additionally or alternatively, the automated application means could infuse the hinge portions of the composite material with silicone or the like, which helps protect the composite material (e.g., a fiber reinforced cloth) from the natural elements while allowing the composite substrate to remain flexible.

Referring to image (C) of FIG. 5, in embodiments in which the hinges 16 are masked, the masking material 18 may be removed once the polymer 22 has cured, exposing the flexible hinges 16. Of course, in embodiments in which the hinges 16 are not masked (instead, the polymer 22 is selectively applied such that the hinges 16 are not coated with the polymer 22), the step of removing the masking material 18 is omitted, and the sheet 12 is ready for folding once the polymer 22 has cured. The sheet 12 is then folded along the hinges 16, with some hinges 16 forming peaks 16a and other hinges 16 forming valleys 16b, to define surface segments 14. As depicted in image (D) of FIG. 5, multiple folded sheets 12 are used to form the column structure 10. Therefore, the steps illustrated in and described with respect to images (A)-(C) are repeated or performed for each sheet 12. In the exemplary embodiment illustrated in image (D), three sheets 12 are used to fabricate the column structure 10. Once the polymer 22 has cured and the hinges 16 exposed on the three sheets 12, the sheets 12 are assembled to form the column structure 10. As shown in image (D), the polymer 22 is applied to an overlapping vertical panel 26 of the first sheet 12a and an overlapping vertical panel 26 of the second sheet 12b, and the panels 26 are brought into contact with one another. Similarly, the polymer 22 is applied to an overlapping vertical panel 28 of the second sheet 12b and an overlapping vertical panel 28 of the third sheet 12c, and the panels 28 are brought into contact with one another. Further, the polymer 22 is applied to an overlapping vertical panel 30 of the third sheet 12c and an overlapping vertical panel 30 of the first sheet 12a, and the panels 30 are brought into contact with one another. Optionally, the polymer 22 may be applied to only one of the panels 26, 28, 30, and in some embodiments, a different polymer than polymer 22 may be applied to the panels 26, 28, 30. The polymer 22 is allowed to cure to couple the first, second, and third sheets 12a, 12b, 12c along the overlapping vertical panels 26, 28, 30 and thereby form the column structure 10. Alternatively, the polymer 22 may be applied to the overlapping panels 26, 28, 30 and the panels positioned against one another during the initial polymer application process illustrated in image (B) and allowed to cure as the polymer 22 applied over the face 24 of each sheet 12 cures. In some embodiments, additional dry reinforcement such as chopped strand (i.e., fiberglass without any orientation) may be placed between one or more overlapping panels 26, 28, 30 to help bond elements together with the polymer 22.

Finally, in some embodiments, a coating or layer of the polymer 22, or any suitable coating material, may be applied to the entire column structure 10 or to selected portions of the column structure 10, i.e., the coating material may be selectively applied to the column structure 10. The coating material may be selected to solidify, rigidify, or strengthen the structure 10; to provide resistance to water, sunlight, or other potentially damaging elements; or to provide other desirable attributes of the structure 10. For example, the polymer 22 may be applied to the non-reinforced hinges 16 (which previously were masked during application of the polymer 22) to strengthen the column structure 10, i.e., a strengthening or rigidifying coating may be applied any non-reinforced areas of the composite structure after folding to provide the composite structure with a desired level of stiffness or strength. However, rigidifying the hinges 16 is optional; in some embodiments, it may be desirable for the hinges 16 to retain flexibility. Moreover, other coatings may be applied to the hinges 16 for different applications or to produce different results than the polymer 22. Further, in some embodiments, more than one coating or layer may be applied to the completed composite structure, and different coating materials may be used for one or more coatings or layers, e.g., a first coating material may be applied to rigidify the column structure 10 and a second coating material may be applied to protect the structure 10 from UV damage. In any event, FIG. 5 illustrates how a generally flat or planar sheet 12 of composite material may be folded to generate the 3D column structure 10.

FIG. 7 illustrates fabrication of the exemplary column structure 10 using one or more methods described herein. As shown in FIG. 7, in one exemplary embodiment, the fabrication process may be completed in about 70 minutes. As discussed with respect to FIG. 5, the exemplary fabrication process includes (A) laying out and masking, using the masking material 18, the locations of hinges 16 on each sheet 12 of composite material; (B) applying the polymer 22; (C) allowing the polymer 22 to cure; (D) removing the masking material 18; (E) placing the first sheet 12a next to the second sheet 12b, positioning the overlap panel 26 of the first sheet 12a against the overlap panel 26 of the second sheet 12b, placing the third sheet 12c next to the second sheet 12b, and positioning the overlap panel 28 of the third sheet 12c against the overlap panel 28 of the second sheet 12b; (F) applying the polymer 22 to the overlap panels 26, 28 and allowing the polymer 22 between the overlap panels 26, 28 to cure; (G) folding the sheets 12 along the hinges 16 to form a compressed stack or flat pack 32; (H) transporting the flat pack 32 to a site on which the column structure 10 is to be erected and unfolding the flat pack 32 at the site; and (I) completely unfolding the column structure 10 such that the sheets 12 extend about the central axis $A_C$. To complete construction of the column structure 10, the fabrication process includes positioning the overlap panel 30 of the third sheet 12c against the overlap panel 30 of the first sheet, applying the polymer 22 to the overlap panels 30, and allowing the polymer 22 to cure at the overlapping panels 30. Optionally, one or more coatings may be applied to the completed column structure 10, e.g., to solidify, strengthen, and/or protect the structure. Further, in other embodiments, one or more steps of the foregoing exemplary fabrication process may be altered, omitted, or performed in a different order than as described with respect to FIG. 7. For instance, the polymer 22 may be selectively applied to the sheet 12 such that the steps (A) and (D) related to the masking material 18 are omitted; instead, during application of the polymer 22, the locations of the hinges 16 are avoided such that no polymer 22 is applied to the hinge locations.

As depicted at (G) and (H) in FIG. 7, the sheets 12 of composite material that form the column structure 10 fold up into a strip referred to herein as a flat pack 32. Compared to the full 3D column structure 10, the flat pack 32 is generally planar and has a minimal thickness. The ability to fold the column structure 10 into the generally planar flat pack 32 allows easier transportation of the structure 10. For instance, the flat pack 32 takes up less space or occupies a smaller volume than the erected column structure 10, which makes the flat pack 32 easier to carry and to ship. Easier transportation of the column structure 10 through the folded up flat pack 32 configuration (which also may be referred to as the flat packed column structure) can reduce transportation time, costs, and complexity of the column structure 10. Thus, as in the exemplary embodiment of FIG. 7, the composite structure can be prefabricated offsite, flat-packed, shipped to the site, and deployed onsite.

It will be appreciated that the column structure 10 is provided by way of example only. The methods and processes described herein may be used to fabricate composite structures having myriad 3D shapes of any suitable size. Further, the folding techniques described herein may impact the design of a structural object. That is, the design of a structural element or object may reflect the use of the folding techniques of the present subject matter to fabricate the structural element or object from a composite material. Further, although described with respect to assembling or erecting composite structures, the methods and processes described herein also include disassembling or taking down composite structures that have been assembled or erected according to one or more exemplary methods. Accordingly, the present subject matter encompasses temporary composite structures, which may be transported in a generally flat or planar configuration, erected on a site at one location, taken down or disassembled at the site such that the structure is returned to the generally flat or planar configuration, and transported to another location or stored.

Figure 8:
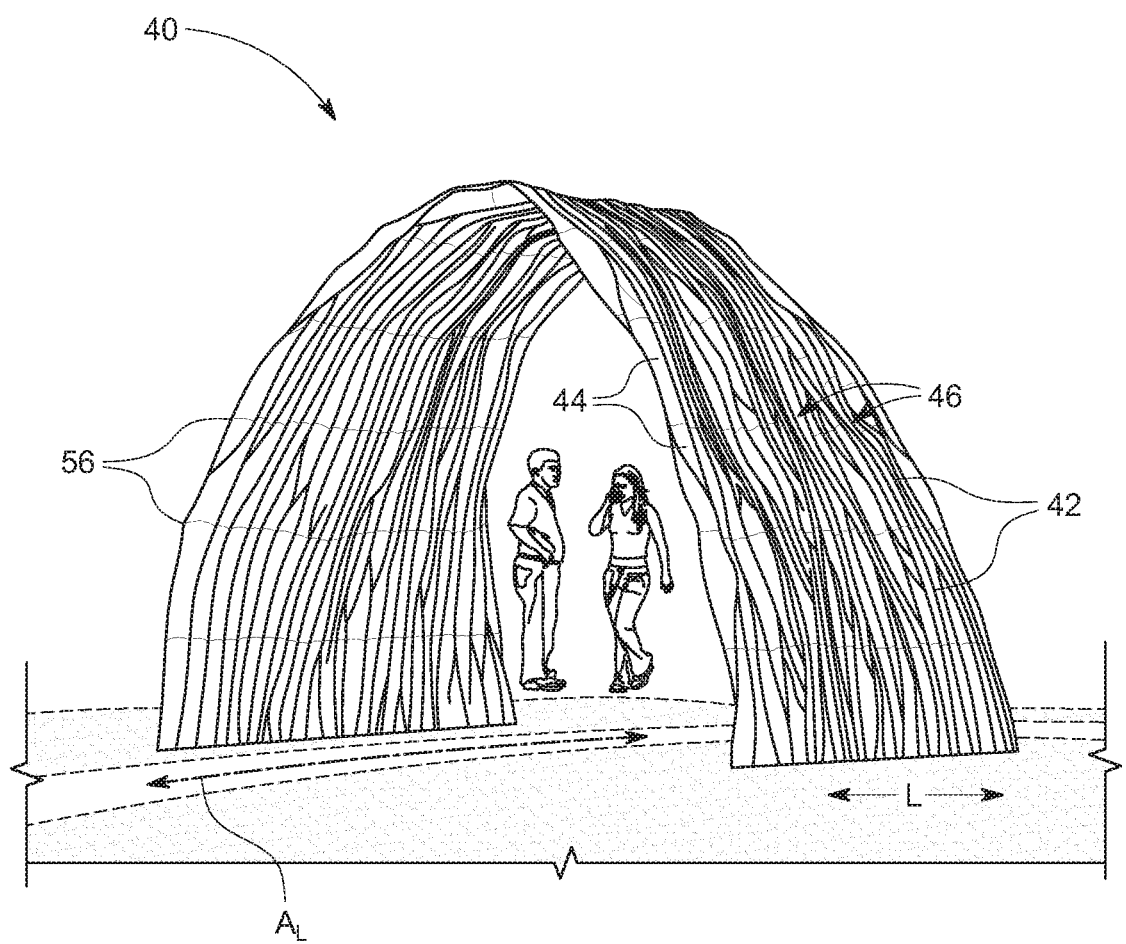
FIG. 8 provides an end perspective view of an arch structure formed by folding at least one generally flat or planar sheet of composite material, according to an exemplary embodiment of the present subject matter.

Turning to FIGS. 8 through 13, another exemplary embodiment of the present subject matter, arch structure 40, is depicted. Like the column structure 10, the arch structure 40 is formed from one or more sheets 42 of a composite material, e.g., a textile-based composite such as a fiber-reinforced-polymer (FRP) where the reinforcing fibers are glass, carbon, or any other suitable reinforcing material. As shown in FIG. 8, the arch structure 40 comprises a plurality of surface segments 44 with hinges 46 between adjacent segments 44. The depicted surface segments 44 are generally planar and define surfaces of the arch structure 40 between the hinges 46. As shown most clearly in FIG. 12, the hinges 46 form either peaks 46a or valleys 46b. Each peak 46a projects away from a longitudinal axis $A_L$ of the arch structure 40, and each valley 46b projects toward the longitudinal axis $A_L$. The longitudinal axis $A_L$ extends along or parallel to a longitudinal direction L defined by the arch structure 40.

Figure 9:
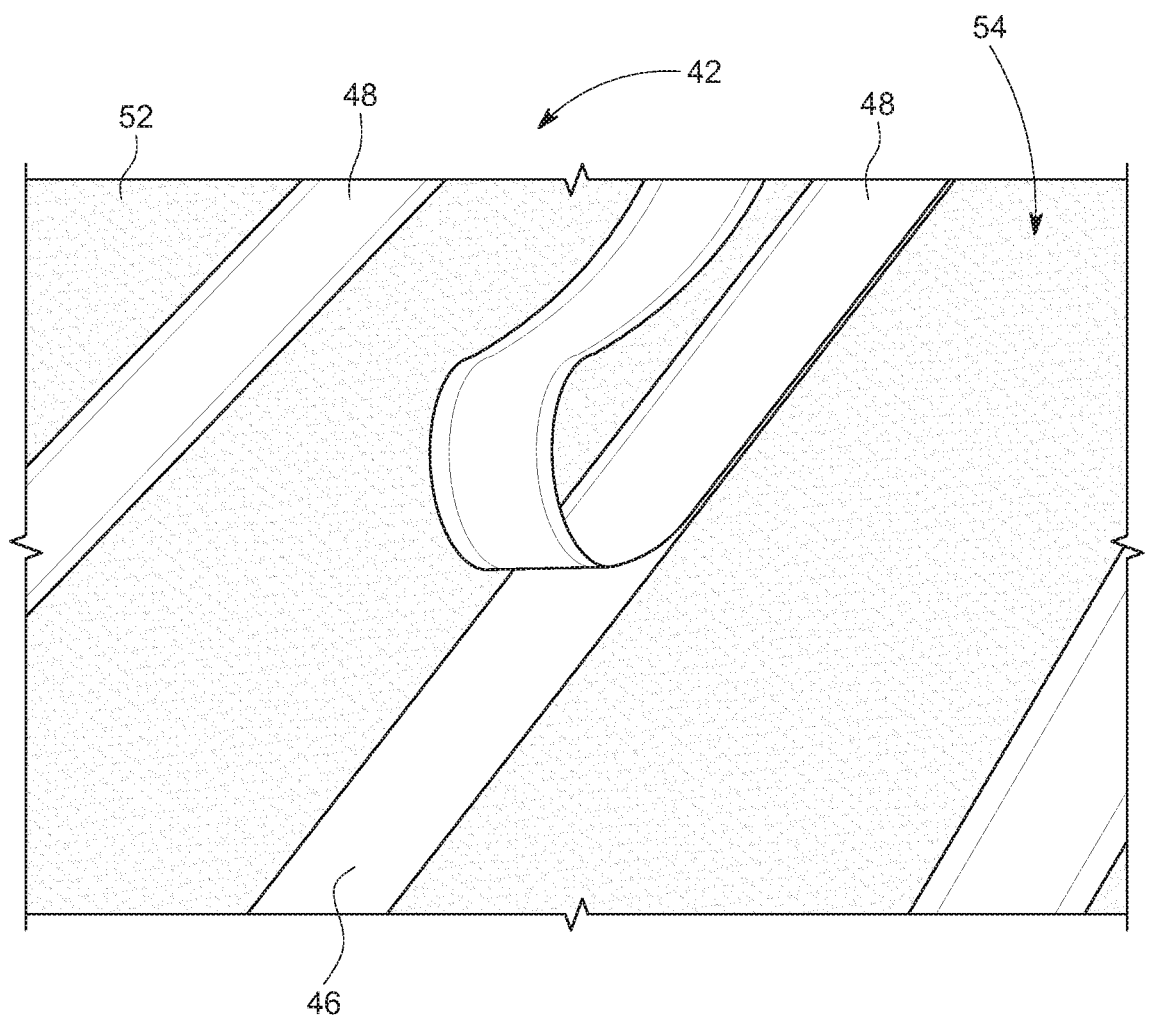
FIG. 9 provides a close-up view of a portion of the arch structure of FIG. 8 as a masking material is removed from hinge locations during fabrication of the arch structure, according to an exemplary embodiment of the present subject matter.

Referring particularly to FIGS. 9-13, the arch structure 40 may be fabricated using a similar method or process as described with respect to the fabrication of the column structure 10. More specifically, first, a composite material is selected, such as a fabric FRP reinforced with glass or carbon fiber (e.g., a woven fiberglass material). A sheet 42 of the composite material is laid flat, i.e., in a planar configuration, and a fold design or pattern is marked on the sheet 42. That is, the location of each crease or hinge 46, along which the sheet 42 will be folded, is marked on the sheet 42. Then, as further depicted in FIG. 9, a rigidifying substance 52, e.g., a polymer 52 such as a resin, is applied to the sheet 42. Preferably, the polymer 52 is selectively applied to the sheet 42, e.g., the polymer 52 is not applied to the hinge locations to facilitate folding of the sheet 42 along the hinges 46, which remain flexible in the absence of the polymer 52. In some embodiments, as shown in FIG. 9, the locations of the hinges 46 are masked with a masking material 48, such as tape or the like. The masking material 48 prevents the polymer 52 from coating the hinges 46, helping to ensure selective application of the polymer 52 and thereby allowing the hinges 46 to retain flexibility for folding the composite material sheet 42 along the hinges 46. In exemplary embodiments, the polymer 52 is applied in an even layer to a face 54 of the sheet 42 until the polymer 52 penetrates a back side (not shown) of the sheet 42 that is opposite the face 54, and the polymer 52 is allowed to cure. In some embodiments, the polymer 52 cures over a period of time at ambient temperature and pressure, but in other embodiments, the sheet 42 may be cured for a period of time at an elevated temperature and/or pressure, e.g., in an oven or a pressurized oven, or by radiation, e.g., through the application of UV or EB energy sources to the polymer 52. It will be appreciated that the polymer 52 generally is applied to the entire area of the sheet 42 except for the portions of the sheet 42 along which the sheet 42 will be folded, i.e., the hinge locations, which may be avoided during application of the polymer 52 or covered by the masking material 48 to prevent application of the polymer 52 thereon. Further, as previously described, in some embodiments a coating such as a b-stage resin, silicone, or the like may be selectively applied to the hinges 46 prior to folding, which allows the hinges 46 to remain flexible enough for folding but imparts one or more desirable characteristics to the composite material at the hinge locations.

Figure 10:
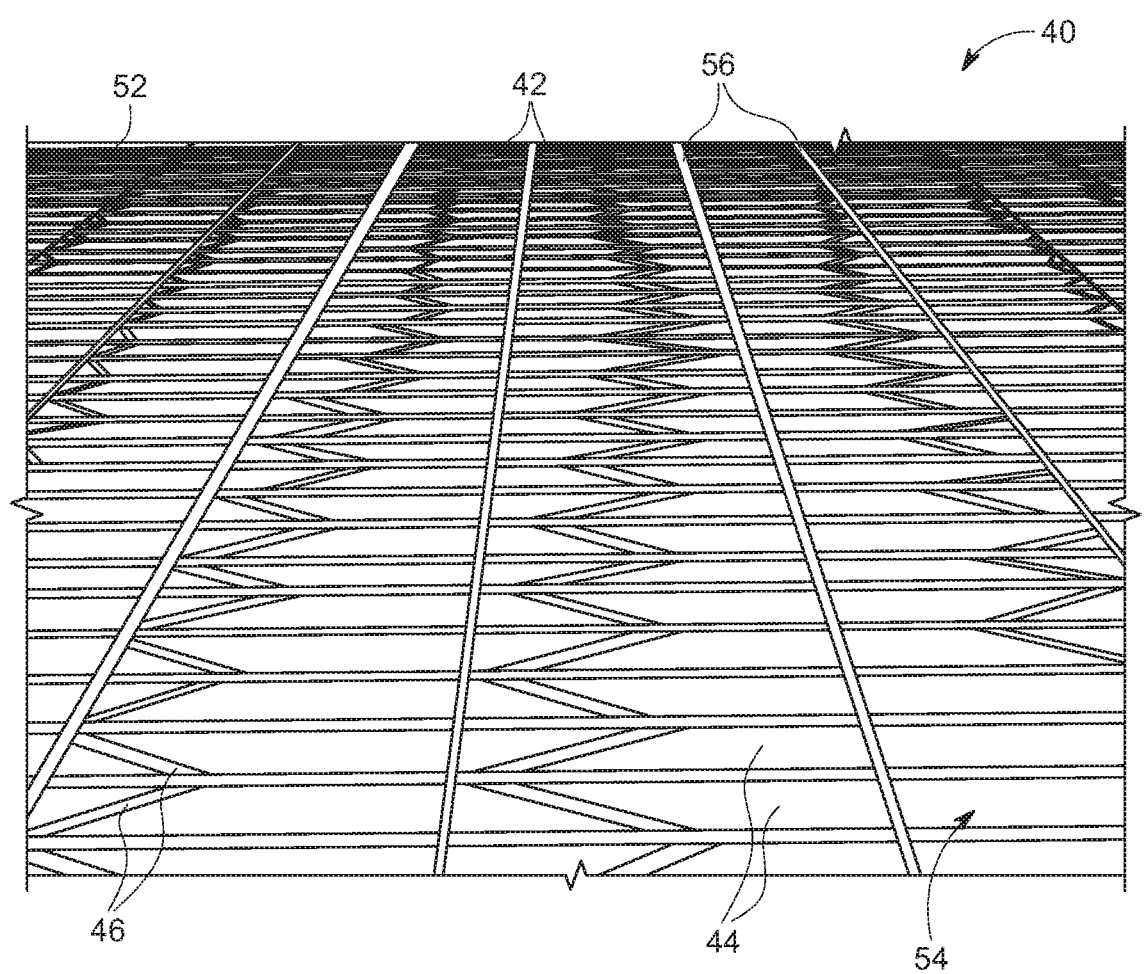
FIG. 10 provides a close-up view of a portion of the arch structure of FIG. 8 after a masking material is removed from all hinge locations during fabrication of the arch structure, according to an exemplary embodiment of the present subject matter.
Figure 11:
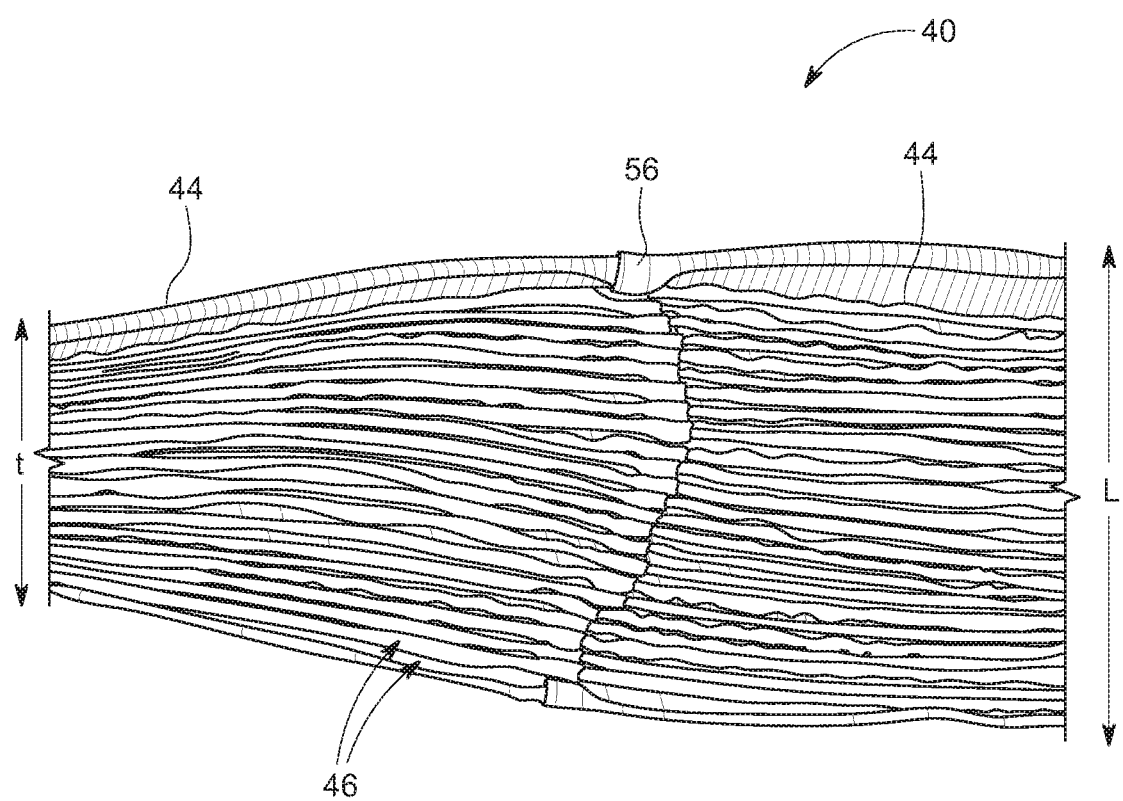
FIG. 11 provides a close-up view of a portion of the arch structure of FIG. 8 in a flat pack configuration, according to an exemplary embodiment of the present subject matter.
Figure 12:
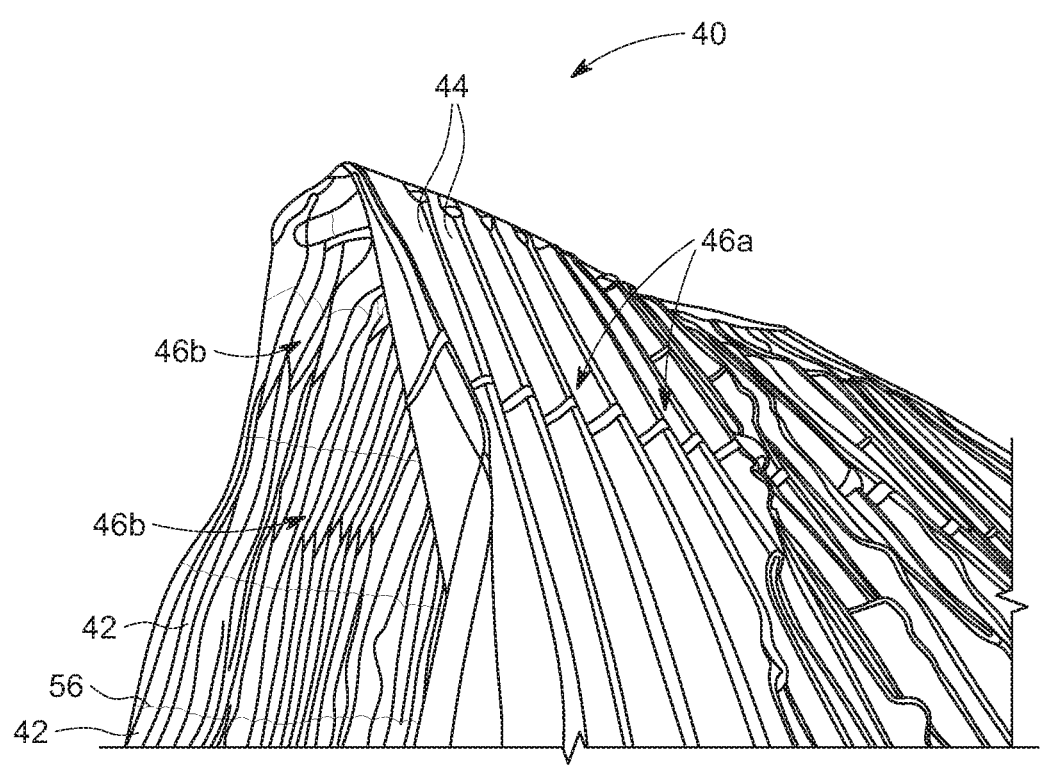
FIG. 12 provides a perspective view of a portion of the arch structure of FIG. 8.
Figure 13:
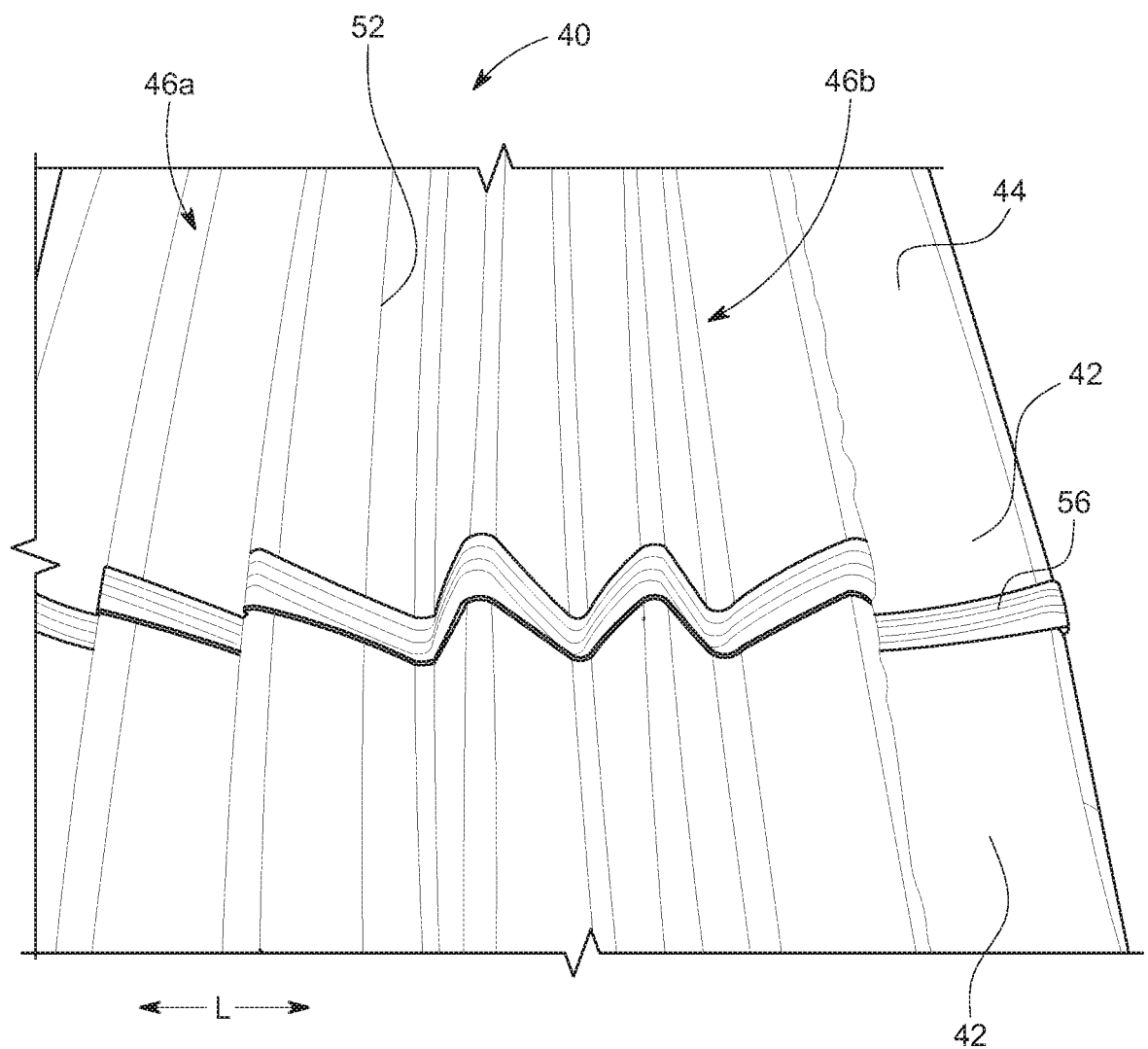
FIG. 13 provides a close-up view of a portion of the arch structure of FIG. 8.

As shown in the exemplary embodiment of FIGS. 9 and 10, the masking material 48 may be removed once the polymer 52 has cured, exposing the flexible hinges 46. It will be appreciated that, in other embodiments, the polymer 52 is selectively applied to the sheet 42 without the use of the masking material 48, e.g., the hinge locations are avoided during application of the polymer 52, such that there is no masking material 48 to remove once the polymer 52 has cured. For example, it will be appreciated that the one or more coatings, such as the rigidifying substance 52, b-stage resin, silicone, etc. may be applied to the composite material 42 by an automated application means, such as a printer 23 or a robotic arm 25 of an automated machine, as described above, e.g., with respect to FIGS. 6A and 6B. Referring to FIG. 11, after removal of the masking material 48, if used, the sheet 42 is then folded along the hinges 46 to define surface segments 54; some hinges 46 form peaks 46a and other hinges 46 form valleys 46b. As depicted in FIGS. 12 and 13, multiple folded sheets 42 are used to form the arch structure 40. Unlike the column structure 10, the sheets 42 preferably are stitched together along seams 56 prior to masking the locations of hinges 46. For instance, strips of the composite material may be stitched together as part of laying out the composite material sheets 42 in a flat or planar configuration before marking the locations of hinges 46. In some embodiments, strips of the composite material may be stitched together as a final step in forming the composite material sheets 42, i.e., in forming the fabric composite material sheets 42. Then, the fabric sheets 42 are rolled up and can be transported to any suitable location for performing the method for forming the composite arch structure 40. In other embodiments, the sheets 42 may be attached or coupled to one another using any suitable fastening technique, e.g., by applying the polymer 52 between overlapping edges of the sheets 42 as described above with respect to the column structure 10. In any event, the polymer 52 is applied over all of the composite material sheets 42 and masked locations of hinges 46 as one step in the process of fabricating the arch structure 40.

Once the polymer 52 has cured and the hinges 46 exposed, the coupled sheets 42 are folded to define the arch structure 40. As shown in FIG. 11, the sheets 42 may be folded along the hinges 46 to form a compressed stack or flat pack 62. Then, if not already at the site, the flat pack 62 may be transported to a site on which the arch structure 40 is to be erected and unfolded at the site, as depicted in FIG. 8. Similar to the column structure 10, the sheets 42 of composite material that form the arch structure 40 fold up into a strip referred to herein as a flat pack 62. Compared to the full 3D arch structure 40, the flat pack 62 is generally planar and can be compressed to have a minimal thickness t. The ability to fold the arch structure 40 into the generally planar flat pack 62 allows easier transportation of the structure 40. For instance, the flat pack 62 takes up less space or occupies a smaller volume than the erected arch structure 40, which makes the flat pack 62 easier to carry and to ship. Easier transportation of the arch structure 40 through the folded up flat pack 62 configuration (which also may be referred to as the flat packed arch structure) can reduce transportation time, costs, and complexity of the arch structure 40, making it easier and less costly to, e.g., prefabricate the arch structure 40 offsite and transport it to the site for deployment.

Finally, in some embodiments, a coating or layer of the polymer 52, or any suitable coating material, may be applied to the entire arch structure 40 or to selected portions of the arch structure 40, i.e., the coating material may be selectively applied to the arch structure 40. The coating material may be selected to solidify, rigidify, or strengthen the structure 40; to provide resistance to water, sunlight, or other potentially damaging elements; or to provide other desirable attributes of the structure 40. For example, the polymer 52 may be applied to the non-reinforced hinges 46 (which previously were masked during application of the polymer 52) to strengthen the arch structure 40, i.e., a strengthening or rigidifying coating may be applied any non-reinforced areas of the composite structure after folding to provide the composite structure with a desired level of stiffness or strength. However, rigidifying the hinges 46 is optional; in some embodiments, it may be desirable for the hinges 46 to retain flexibility. Moreover, other coatings may be applied to the hinges 46 for different applications or to produce different results than the polymer 52. Further, in some embodiments, more than one coating or layer may be applied, and different coating materials may be used for one or more coatings or layers, e.g., a first coating material may be applied to rigidify the arch structure 40 and a second coating material may be applied to protect the structure 40 from UV damage.

It will be appreciated that one or more portions of the fabrication processes described herein may be performed manually or may be partially or fully automated. For example, the polymer 22 of the columnar structure 10 or the polymer 52 of the arch structure 40 may be selectively applied manually or using a semi-automated or a fully automated process. For instance, the polymers 22, 52 may be applied to the sheets 12, 42 using inkjet printing or a similar process, or using a robotic coating technique. As another example, applying and removing the masking materials 18, 48 may be manual or automated steps of the fabrication process.

Figure 14:
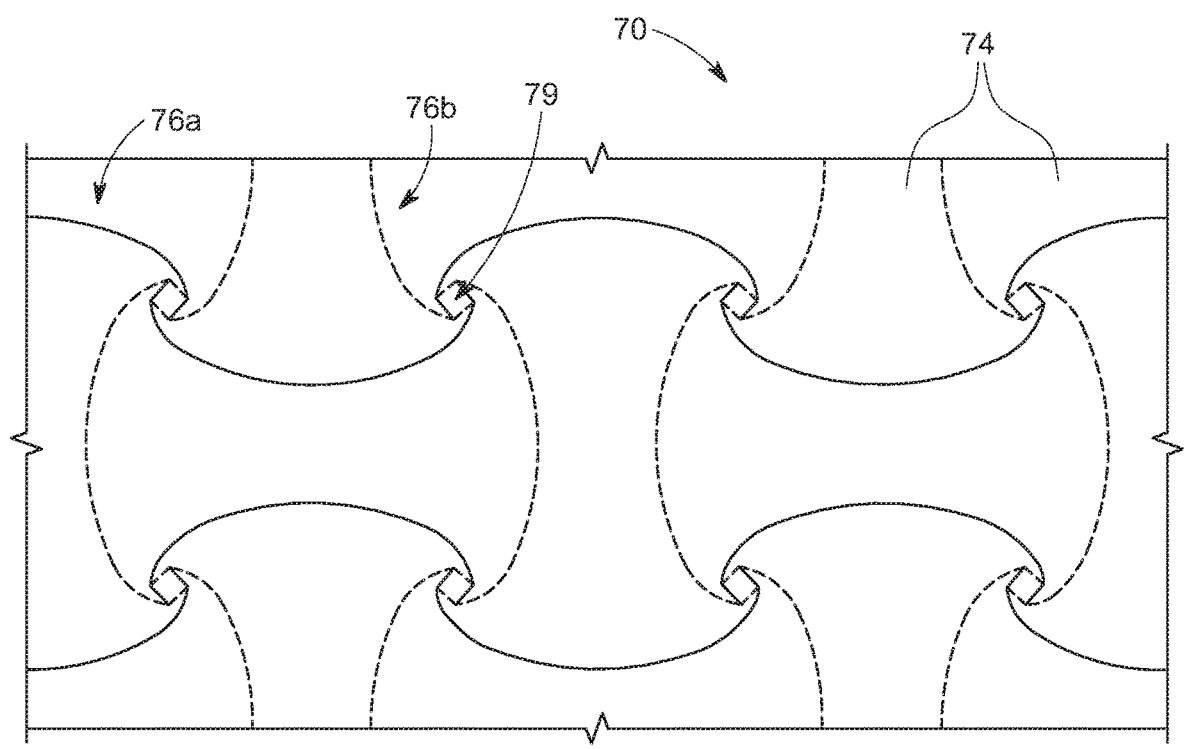
FIG. 14 provides a schematic view of a crease or fold pattern for a panel, according to an exemplary embodiment of the present subject matter.
Figure 15:
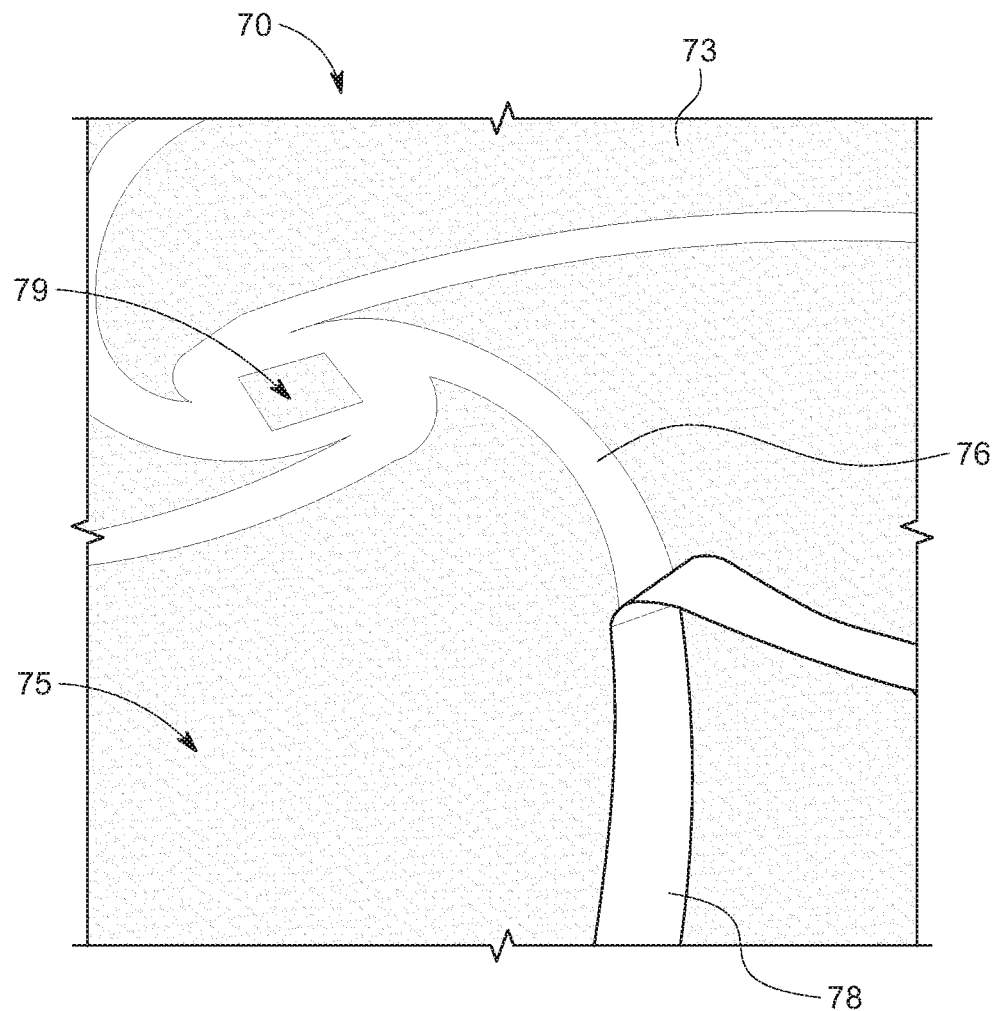
FIG. 15 provides a close-up view of a portion of a panel formed using the pattern of FIG. 14 as a masking material is removed from hinge locations during fabrication of the panel, according to an exemplary embodiment of the present subject matter.
Figure 16:
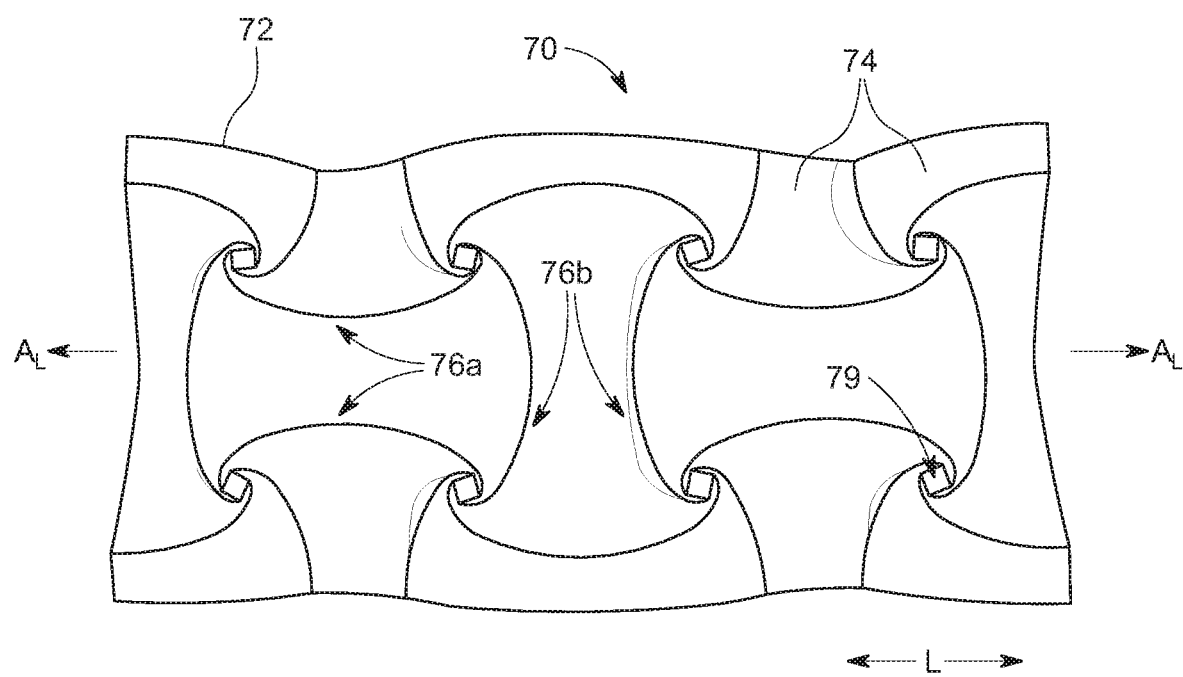
FIG. 16 provides a top view of a panel formed by folding at least one generally flat or planar sheet of composite material using the pattern of FIG. 14, according to an exemplary embodiment of the present subject matter.

Further, it will be understood that the present subject matter encompasses many variations of foldable structures. For example, in addition to or as alternatives to the column structure 10 and the arch structure 40 described above, foldable structures such as panels for forming walls or roofs, various column structures, saddle structures, etc. More particularly, referring to FIGS. 14-16, a panel 70 is illustrated according to an exemplary embodiment of the present subject matter. The panel 70 may be defined by a tessellating shape and may be used, e.g., as a wall panel and/or as a roof panel. In the depicted embodiment, the panel 70 has a geometry that could be advantageous to acoustic applications, and thus, the illustrated panel 70 may be referred to as an acoustic panel. However, the illustrated geometry is by way of example only; other geometries generating enhanced acoustics, or, additionally or alternatively, other advantageous characteristics, also may be used for the panel 70. Further, the panel 70 shown in the exemplary embodiment of FIGS. 14-16 has significant structural depth. As previously stated, the panel 70 could be used as an acoustic wall panel, or the same pattern could be reinterpreted as a reflective ceiling plan for a roof structure. As illustrated, the panel 70 is comprises a plurality of nodes 79, which could be square as shown in the figures or any other suitable shape, such as circular, rectangular, oval, etc. In some embodiments, each of the nodes 79 could be moments for the structure to connect to a column grid. For instance, a column, such as one of the various column structures described herein, could be positioned below each node 79 of the panel 70 such that the columns support the panel 70 and the panel 70 forms a roof or ceiling. Thus, in some embodiments, the panel 70 may be a tessellation with nodes 79 as depicted in FIGS. 14-16. Additionally or alternatively, the curves of hinges 76 may be deeper or shallower than as illustrated in FIGS. 14-16. It will be understood that the specific curve profile of hinges 76 will influence the structural depth of the panel 70. Moreover, the scale and spacing of the nodes 79 may vary between embodiments of the panel 70, influencing the sizing and spanning distance between columns placed at the nodes 79.

Like the column structure 10 and the arch structure 40, the panel 70 may be formed from one or more sheets 72 of a composite material, e.g., a textile-based composite such as a fiber-reinforced-polymer (FRP) where the reinforcing fibers are glass, carbon, or any other suitable reinforcing material.

As shown in FIG. 14, the panel 70 comprises a plurality of surface segments 74 with hinges 76 between adjacent surface segments 74. The surface segments 74 define surfaces of the panel 70 between hinges 76. As shown most clearly in FIG. 16, the hinges 76 form either peaks 76a or valleys 76b. Each peak 76a projects away from a longitudinal axis $A_L$ of the panel 70, and each valley 76b projects toward the longitudinal axis $A_L$. The longitudinal axis $A_L$ extends along or parallel to a longitudinal direction L defined by the panel 70. Further, the surface segments 74 are not planar, unlike segments between hinges of other foldable structures described herein, such as the surface segments 44 of the arch structure 40. Rather, each surface segment 74 incorporates a curvature along at least a portion of its surface such that the segment 74 has a curving transition from one plane to another. For instance, referring to FIG. 16, each surface segment 74 curves toward or away from the hinges 76 along which the sheet 72 is folded to define the segment 74. Accordingly, the plurality of nodes 79 may be defined in a plane, and some surface segments 74 may be raised with respect to (or project from) the plane in which the nodes 79 lie.

The panel 70 may be fabricated using a similar method or process as described with respect to the fabrication of the column structure 10 and arch structure 40. More specifically, first, a composite material is selected, such as a fabric FRP reinforced with glass or carbon fiber (e.g., a woven fiberglass material). A sheet 72 of the composite material is laid flat, i.e., in a planar configuration, and a fold design or pattern is marked on the sheet 72. That is, the location of each crease or hinge 76, along which the sheet 72 will be folded, is marked on the sheet 72. Then, as depicted in FIG. 15, a rigidifying substance 73, e.g., a polymer 73 such as a resin, is applied to the sheet 72. Preferably, the polymer 73 is selectively applied to the sheet 72, e.g., the polymer 73 is not applied to the hinge locations to facilitate folding of the sheet 72 along the hinges 76, which remain flexible in the absence of the polymer 73. In some embodiments, as shown in FIG. 15, the locations of the hinges 76 are masked with a masking material 78, such as tape or the like. The masking material 78 prevents the polymer 73 from coating the hinges 76, helping to ensure selective application of the polymer 73 and thereby allowing the hinges 76 to remain flexible to facilitate folding the composite material sheet 72 along the hinges 76. In exemplary embodiments, such as illustrated in FIG. 15, the masking material 78 may be vinyl cut on a drag knife machine (which is similar to a CNC machine). In such embodiments, vinyl transfer tape also could be used to move the vinyl onto the sheet 72 of composite material.

In exemplary embodiments, the polymer 73 is applied in an even layer to a face 75 of the sheet 72 until the polymer 73 penetrates a back side (not shown) of the sheet 72 that is opposite the face 75, and the polymer 73 is allowed to cure. In some embodiments, the polymer 73 cures over a period of time at ambient temperature and pressure, but in other embodiments, the sheet 72 may be cured for a period of time at an elevated temperature and/or pressure, e.g., in an oven or a pressurized oven, or by radiation, e.g., through the application of UV or EB energy sources to the polymer 73. It will be appreciated that the polymer 73 generally is applied to the entire area of the sheet 72 except for the portions of the sheet 72 along which the sheet 72 will be folded, i.e., the hinge locations, which may be avoided during application of the polymer 73 or covered by the masking material 78 to prevent application of the polymer 73 thereon. Further, as previously described, in some embodiments a coating such as a b-stage resin, silicone, or the like may be selectively applied to the hinges 76 prior to folding, which allows the hinges 76 to remain flexible enough for folding but imparts one or more desirable characteristics to the composite material at the hinge locations.

As shown in the exemplary embodiment of FIG. 15, the masking material 78 may be removed once the polymer 73 has cured, exposing the flexible hinges 76. It will be appreciated that, in other embodiments, the polymer 73 is selectively applied to the sheet 72 without the use of the masking material 78, e.g., the hinge locations are avoided during application of the polymer 73, such that there is no masking material 78 to remove once the polymer 73 has cured. For instance, it will be appreciated that the one or more coatings, such as the rigidifying substance 73, b-stage resin, silicone, etc. may be applied to the composite material 72 by an automated application means, such as a printer 23 or a robotic arm 25 of an automated machine, as described above, e.g., with respect to FIGS. 6A and 6B. Referring to FIG. 16, after removal of the masking material 78, if used, the sheet 72 is then folded along the hinges 76 to define the surface segments 74; some hinges 76 form peaks 76a and other hinges 76 form valleys 76b.

In some embodiments, multiple folded sheets 72 (i.e., multiple panels 70) may be used to form a structure or at least a portion of the structure. For instance, the sheets 72 may be joined by applying an agent such as polymer 73 between overlapping segments of the sheets 72, e.g., as described with respect to the column structure 10, or the sheets 72 may be stitched together, e.g., as described with respect to the arch structure 40. As one example, strips of the composite material may be stitched together as part of laying out the composite material sheets 72 in a flat or planar configuration before marking the locations of hinges 76. In some embodiments, strips of the composite material may be stitched together as a final step in forming the composite material sheets 72. Then, the sheets 72 may be, e.g., rolled up and transported to any suitable location for performing the method for forming the panel(s) 70 and any structure constructed therefrom. In other embodiments, the sheets 72 may be attached or coupled to one another using any suitable fastening technique.

Once the polymer 73 has cured and the hinges 76 exposed, the sheet(s) 72 may be folded to define the panel 70. As described with respect to the column structure 10 and the arch structure 40, the sheet(s) 72 may be folded along the hinges 76 to form a compressed stack or flat pack. If not already at the site, the flat pack may be transported to a site on which the panel 70 is to be used and then unfolded at the site. In some embodiments, unlike the column structure 10 and arch structure 40, which may fold up into a strip, the panel 70 when folded may be more like a flat sheet. Compared to the deployed, full 3D panel 70, the flat pack or sheet of the undeployed panel 70 is generally planar and can be compressed to have a minimal thickness. It will be appreciated that the ability to fold the panel 70 into a generally planar flat pack or sheet allows easier transportation of the panel 70. For instance, the flat pack or sheet takes up less space or occupies a smaller volume than the deployed panel 70, which makes the flat pack or sheet easier to carry and to ship. Easier transportation of the panel 70 through the folded up flat pack or sheet configuration (which also may be referred to as the flat packed panel) can reduce transportation time, costs, and complexity of the panel 70, making it easier and less costly to, e.g., prefabricate the panel 70 offsite and transport it to the site for deployment.

Finally, in some embodiments, a coating or layer of the polymer 73, or any suitable coating material, may be applied to the entire panel 70 or to selected portions of the panel 70, i.e., the coating material may be selectively applied to the panel 70. The coating material may be selected to solidify, rigidify, or strengthen the panel 70; to provide resistance to water, sunlight, or other potentially damaging elements; or to provide other desirable attributes of the panel 70. For example, the polymer 73 may be applied to the non-reinforced hinges 76 (which previously were masked during application of the polymer 73) to strengthen the panel 70, i.e., a strengthening or rigidifying coating may be applied any non-reinforced areas of the composite structure after folding to provide the composite structure with a desired level of stiffness or strength. However, rigidifying the hinges 76 is optional; in some embodiments, it may be desirable for the hinges 76 to retain flexibility. Moreover, other coatings may be applied to the hinges 76 for different applications or to produce different results than the polymer 73. Further, in some embodiments, more than one coating or layer may be applied, and different coating materials may be used for one or more coatings or layers. As one example, a first coating material may be applied to rigidify the panel 70 and a second coating material may be applied to protect the panel 70 from UV damage.

Figure 17:
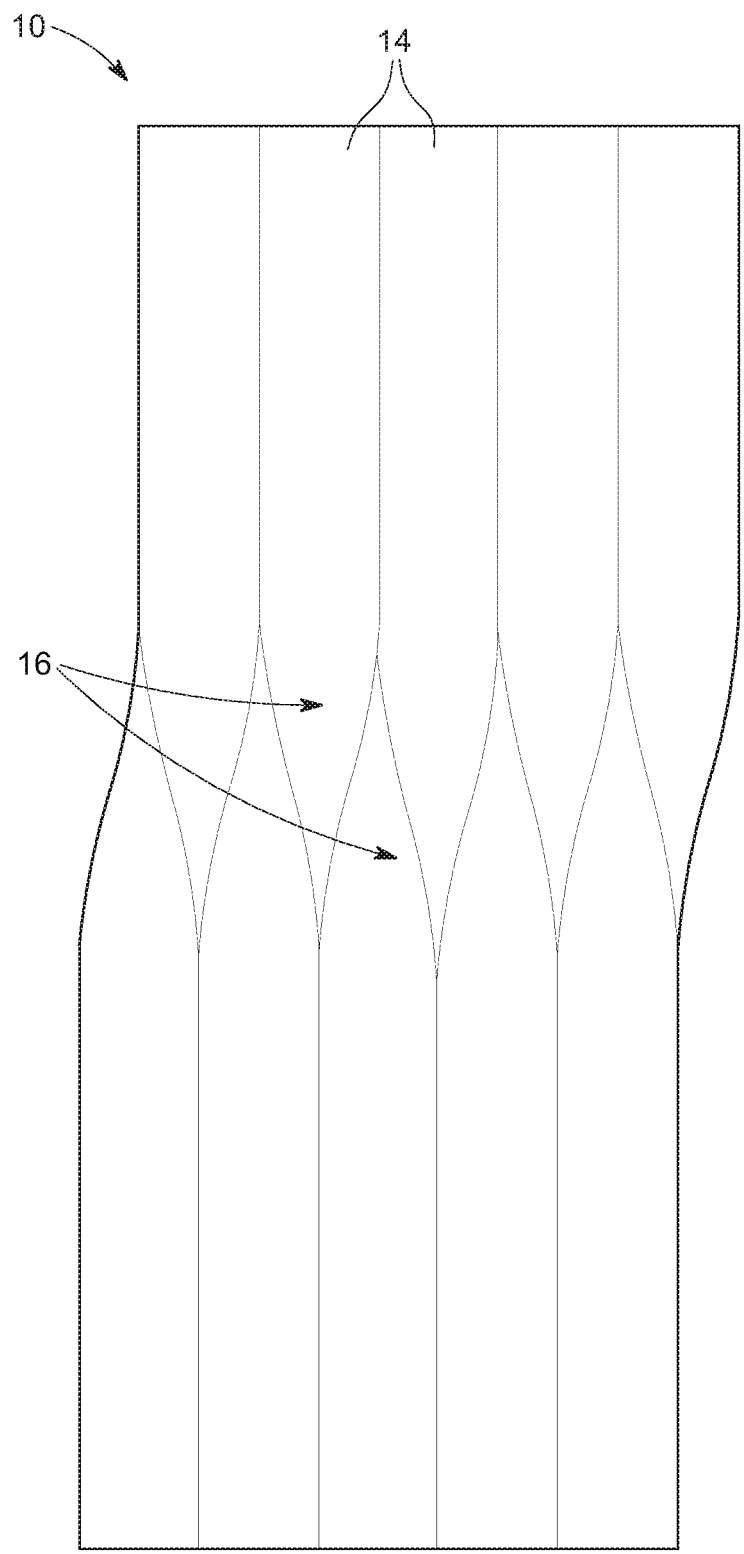
FIGS. 17-26 provide schematic views of crease or fold patterns for column structures and side perspective views of column structures formed from such patterns, according to various exemplary embodiments of the present subject matter.
Figure 18:
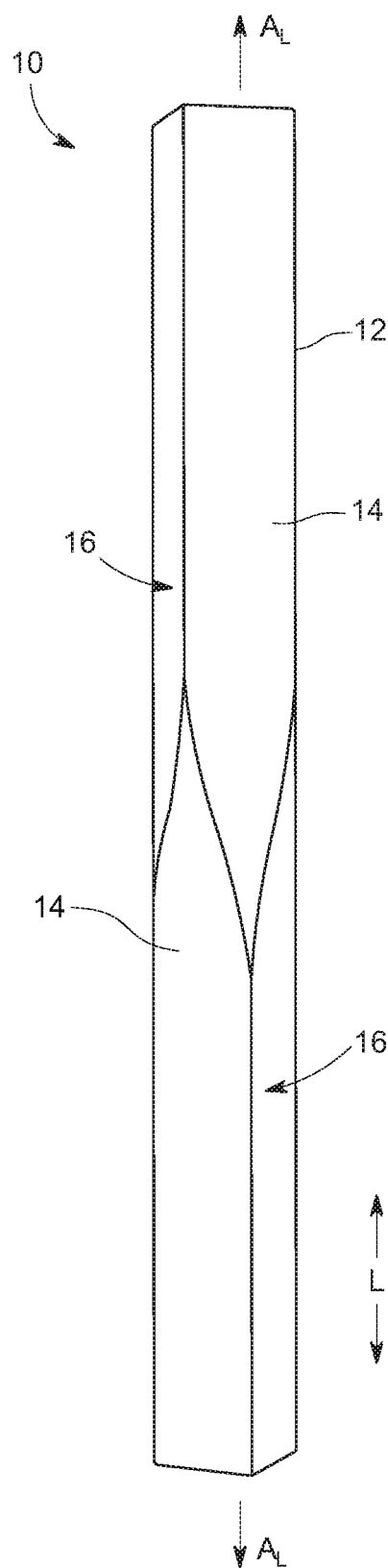
Figure 19:
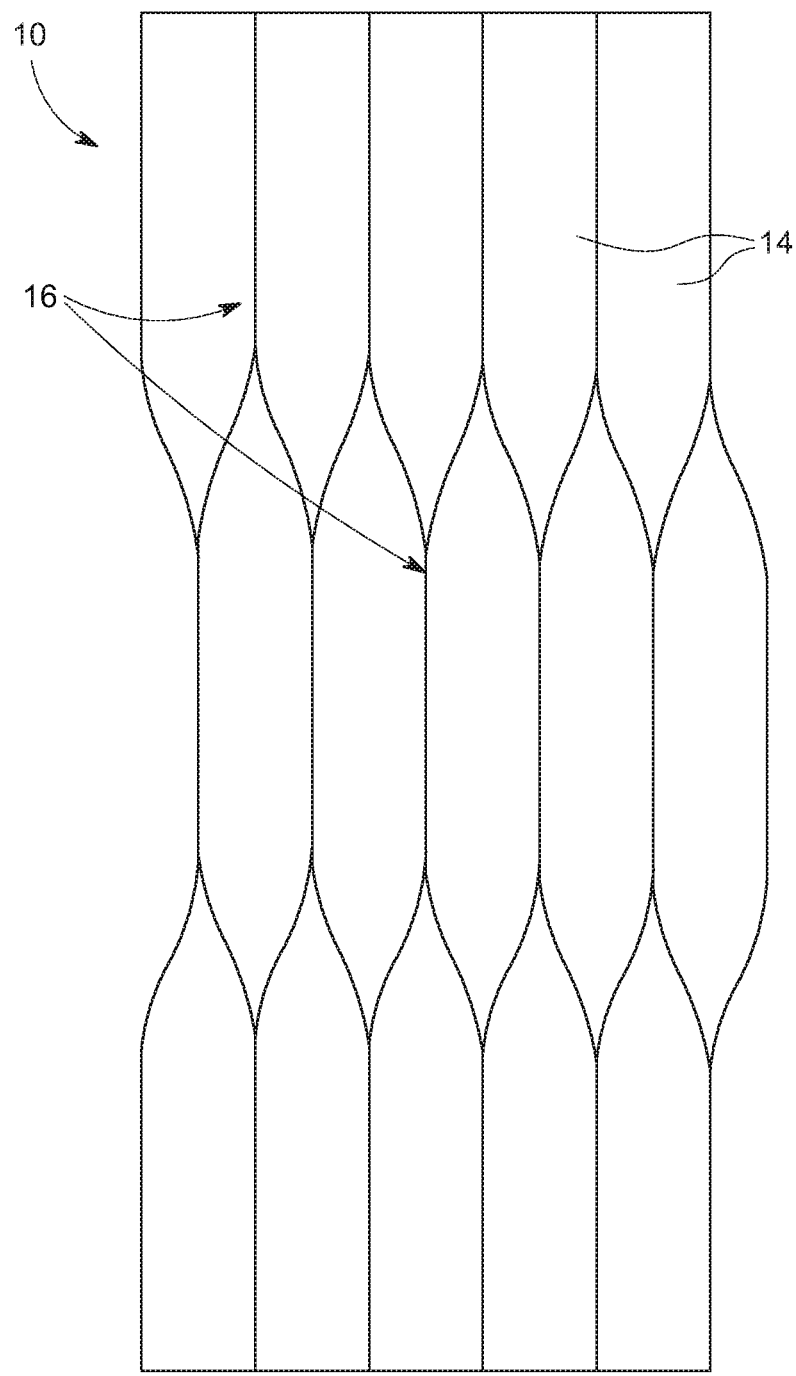
Figure 20:
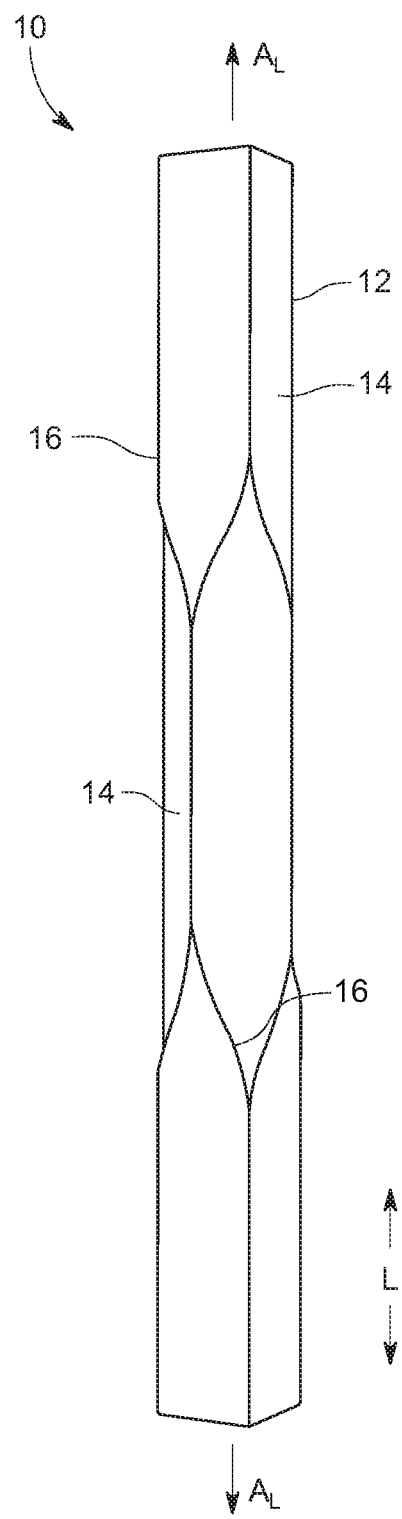
Figure 21:
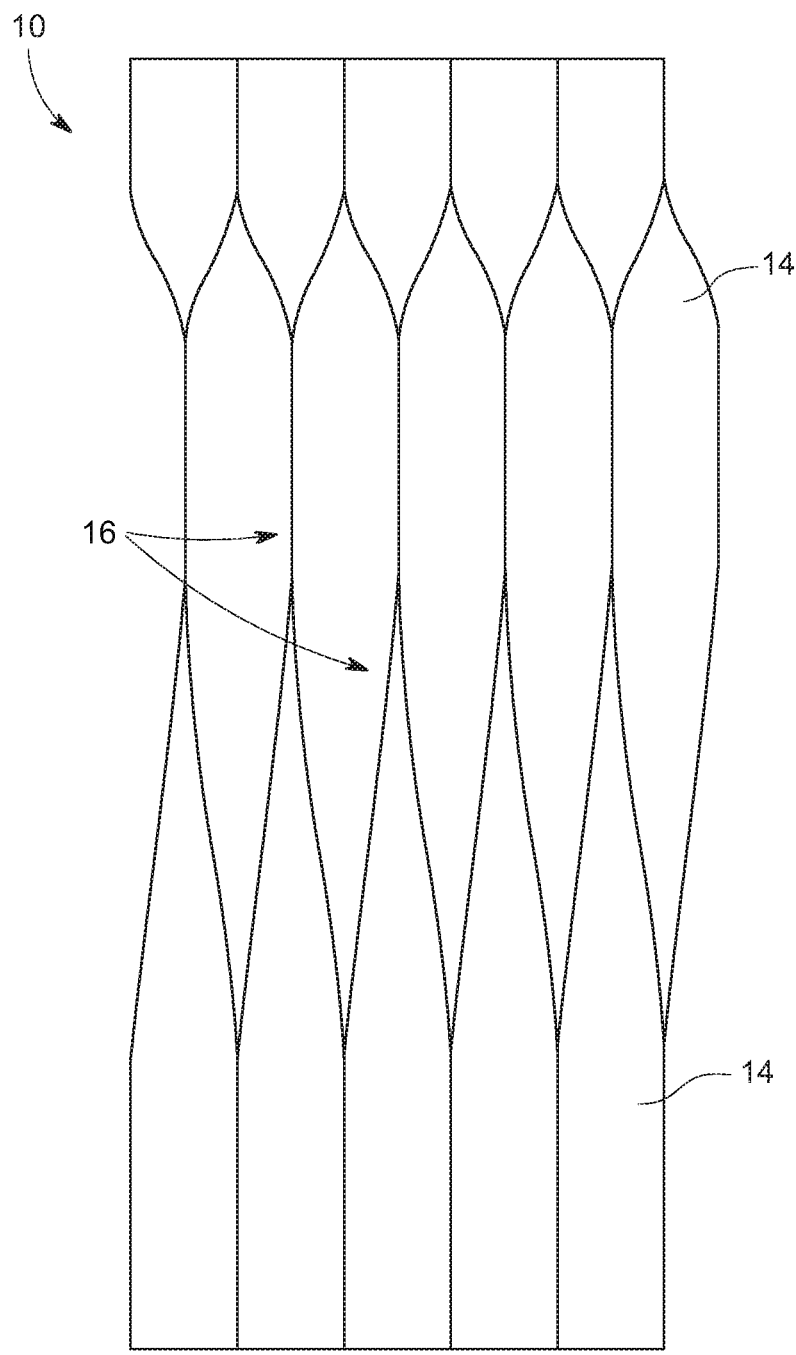
Figure 22:
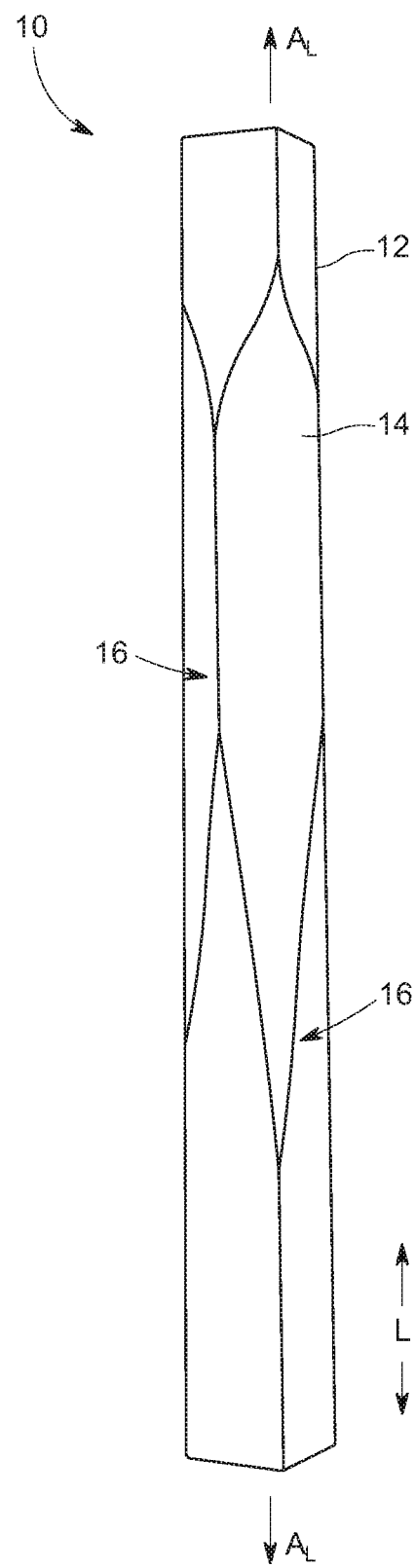
Figure 23:
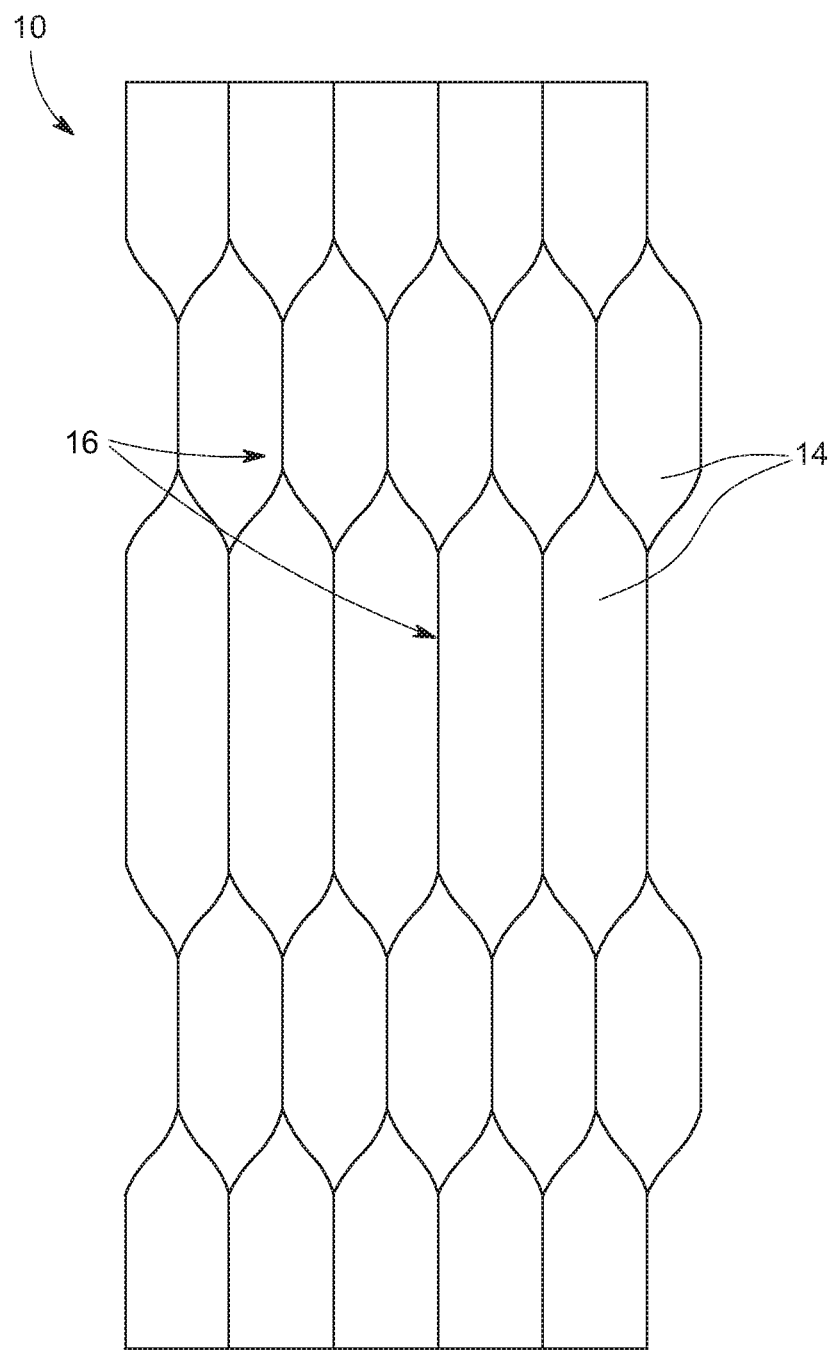
Figure 24:
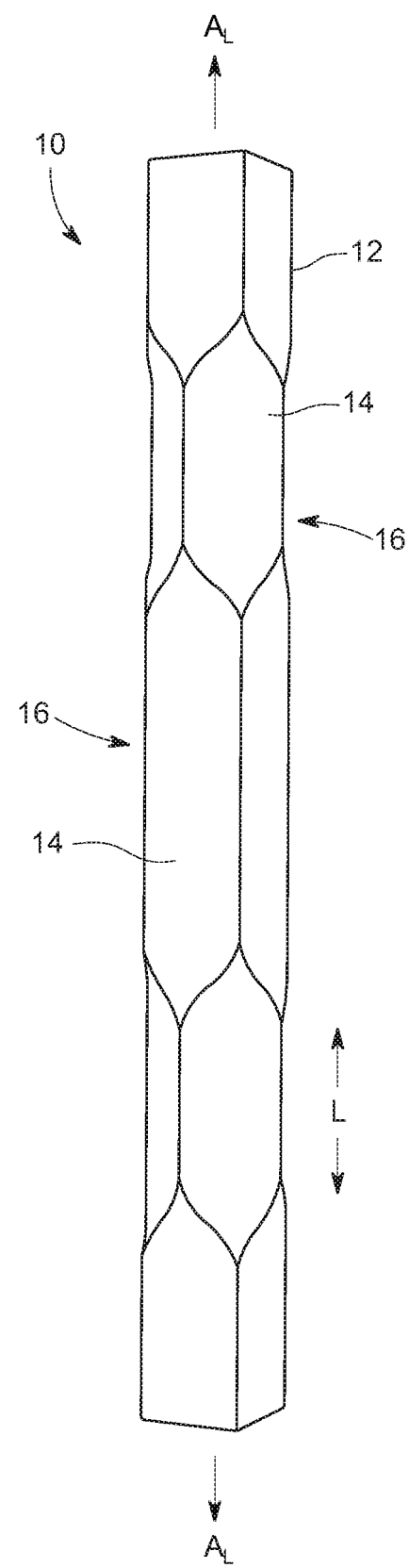
Figure 25:
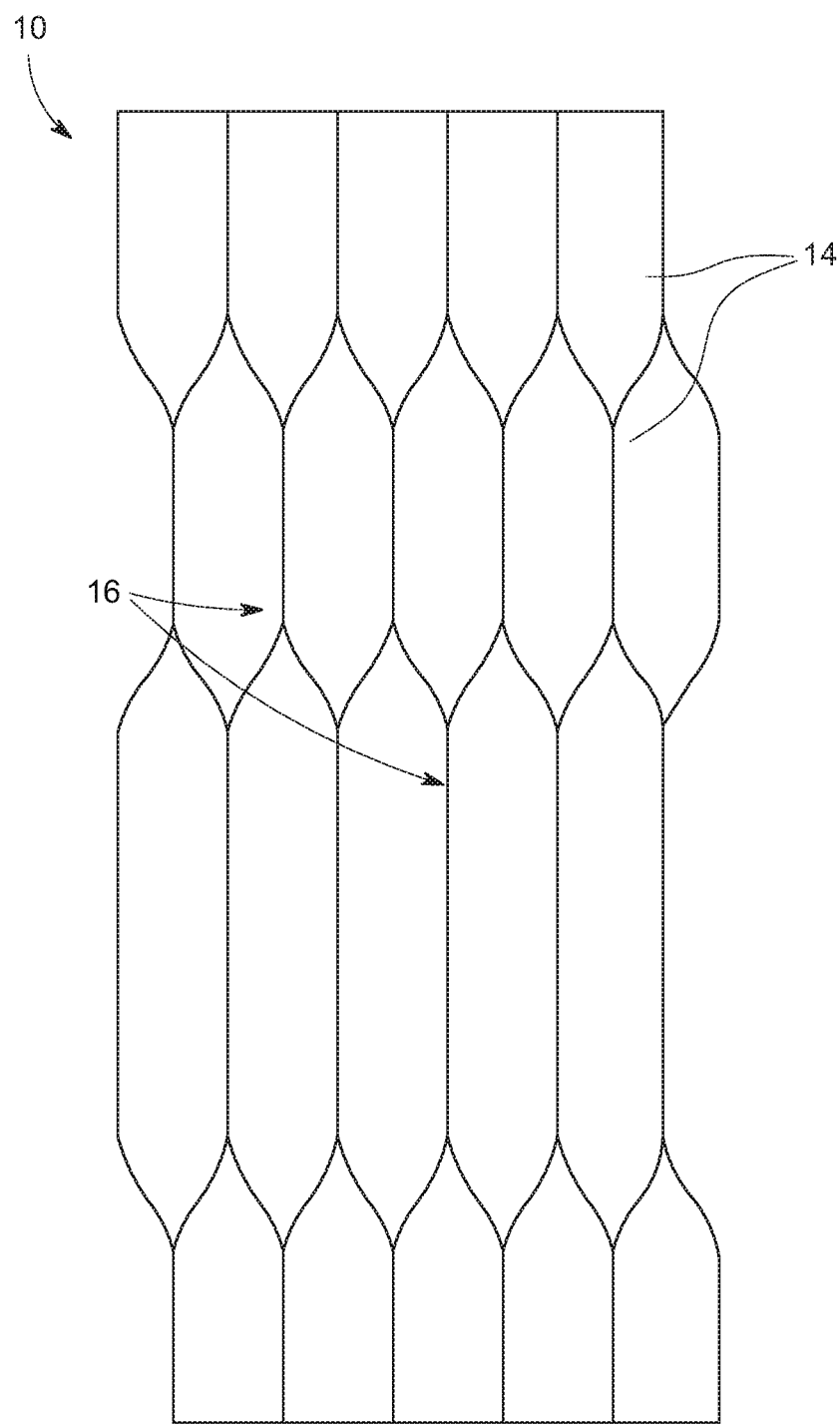
Figure 26:
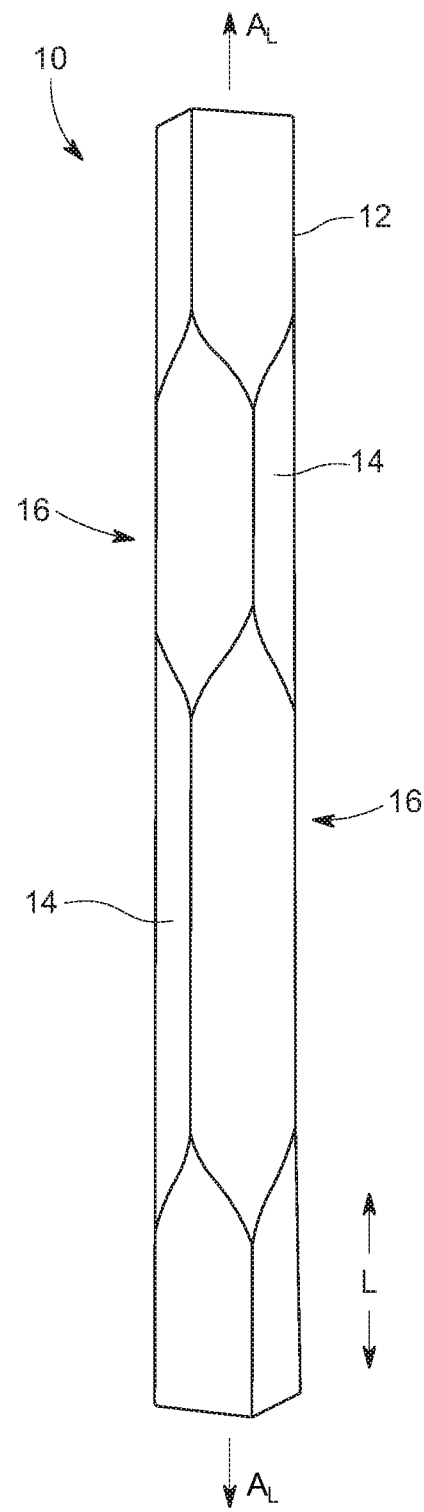

Turning now to FIGS. 17-26, various column structures 10 are illustrated according to other exemplary embodiments of the present subject matter. More particularly, FIGS. 17-26 illustrate fold or crease patterns that may be used to construct the depicted three-dimensional column structures 10. For example, FIG. 17 provides a fold or crease pattern for the column structure 10 shown in FIG. 18. The fold or crease pattern of FIG. 17 indicates where the sheet of composite material 12 should be folded to define the hinges 16 of the column structure 10. Similarly, FIG. 19 provides a fold or crease pattern for the column structure 10 shown in FIG. 20, FIG. 21 provides a fold or crease pattern for the column structure 10 shown in FIG. 22, FIG. 23 provides a fold or crease pattern for the column structure 10 shown in FIG. 24, and FIG. 25 provides a fold or crease pattern for the column structure 10 shown in FIG. 26.

As illustrated in FIGS. 17-26, not all folded structures according to the present subject matter need have both peak hinges and valley hinges. That is, unlike the column structure 10 of FIGS. 1-7, which includes both peak hinges 16a and valley hinges 16b, the column structures 10 of FIGS. 17-26 are constructed with hinges 16 that only form peaks. Further, similar to the panel 70 illustrated in FIG. 16, the column structures 10 of FIGS. 17-26 include curved surface segments 14 rather than generally planar surface segments 14 as depicted, e.g., in FIGS. 1-3, 5, and 7. However, it will be appreciated that folded columns structures can be created using any combination of elements described herein, e.g., a column could be constructed using a series of mountain or peak folds or a series of peak and valley folds. In some embodiments, an additional strip or section is included to overlap another strip or section. Chopped strand (i.e., fiberglass without any orientation) may be used with resin to adhere or attach the two strips or sections together and, for example, thereby form a closed column. In other embodiments, instead of, e.g., using five strips or sections to form a four sided column, eight strips or sections could be used to have double thickness on all sides. That is, the eight sections could be folded in on themselves to form a four sided column with the thickness of two sections on each of the four sides. Further, each column structure 10 shown in FIGS. 17-26 may be fabricated using a similar method or process as described with respect to the fabrication of the arch structure 40 and/or the column structure 10 described with respect to FIGS. 1-7.

Figure 27:
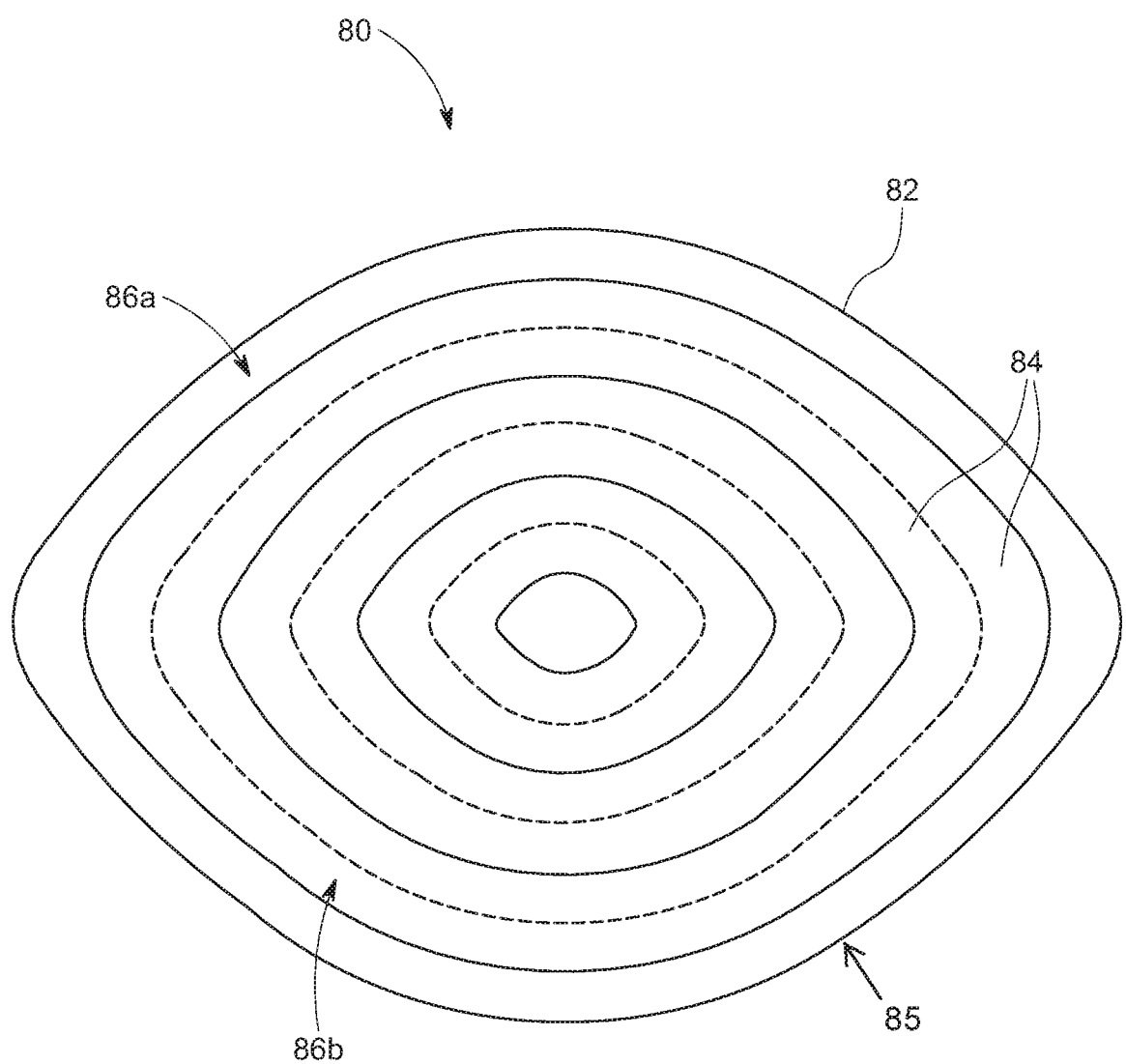
FIG. 27 provides a schematic view of a crease or fold pattern for a saddle structure, according to an exemplary embodiment of the present subject matter.
Figure 28A:
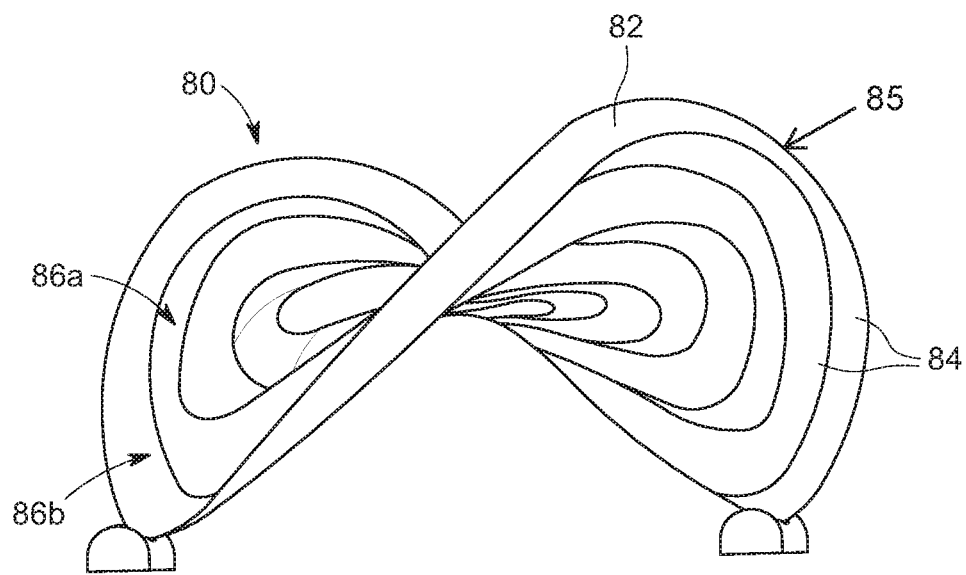
FIGS. 28A-28C provide various side perspective views of a saddle structure formed by folding at least one generally flat or planar sheet of composite material using the pattern of FIG. 27, according to an exemplary embodiment of the present subject matter.
Figure 28B:
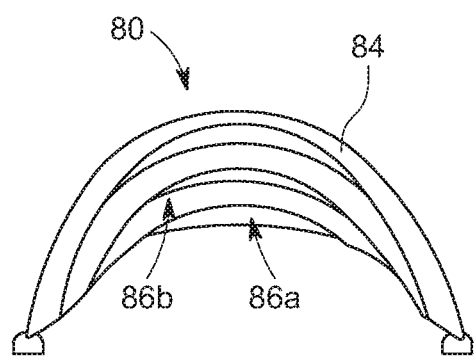
Figure 28C:
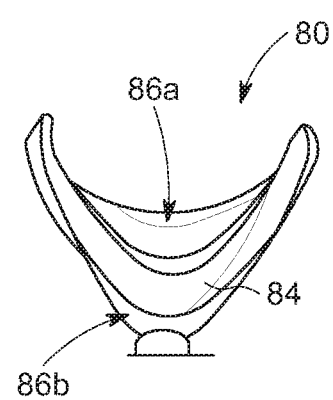

Referring now to FIGS. 27 and 28, the present subject matter also encompasses saddle foldable structures. A saddle structure 80 is a structure having negative Gaussian curvature or anticlastic geometry. The saddle structure 80, an example of which is depicted in FIGS. 27 and 28, may be deployed without any scaffolding, like the arch structure 40. As an example, individuals may hold each end of the saddle structure 80 and walk toward each other, and the bi-stable saddle structure 80 will naturally "pop" into its final position. In some embodiments, the saddle structure 80 may be anchored into the ground and the hinges 86 stiffened or frozen as described herein, and in such embodiments, the structure 80 will perform structurally in a static state. In some embodiments, tensile cables may be used to temporarily pull inward one or more outer edges 85 of the saddle structure 80.

Similar to the column structures 10, the arch structure 40, and the panel 70, the saddle structure 80 may be formed from one or more sheets 82 of a composite material, e.g., a textile-based composite such as a fiber-reinforced-polymer (FRP) where the reinforcing fibers are glass, carbon, or any other suitable reinforcing material. As shown in FIG. 27, the saddle structure 80 comprises a plurality of surface segments 84 with hinges 86 between adjacent surface segments 84. The surface segments 84 define surfaces of the structure 80 between hinges 86. As shown most clearly in FIG. 28, the hinges 86 form either peaks 86a or valleys 86b. Further, the surface segments 84 may be developable planes, having zero-Gaussian curvature, while the hinges 86 may have curvature. It will be appreciated that the saddle structure 80 may be fabricated using a similar method or process (e.g., laying out the dry material, selectively applying a rigidifying substance, folding along the hinges 86, applying additional coating(s)) as described with respect to the fabrication of the column structure 10, arch structure 40, and/or panel 70.

Figure 29:
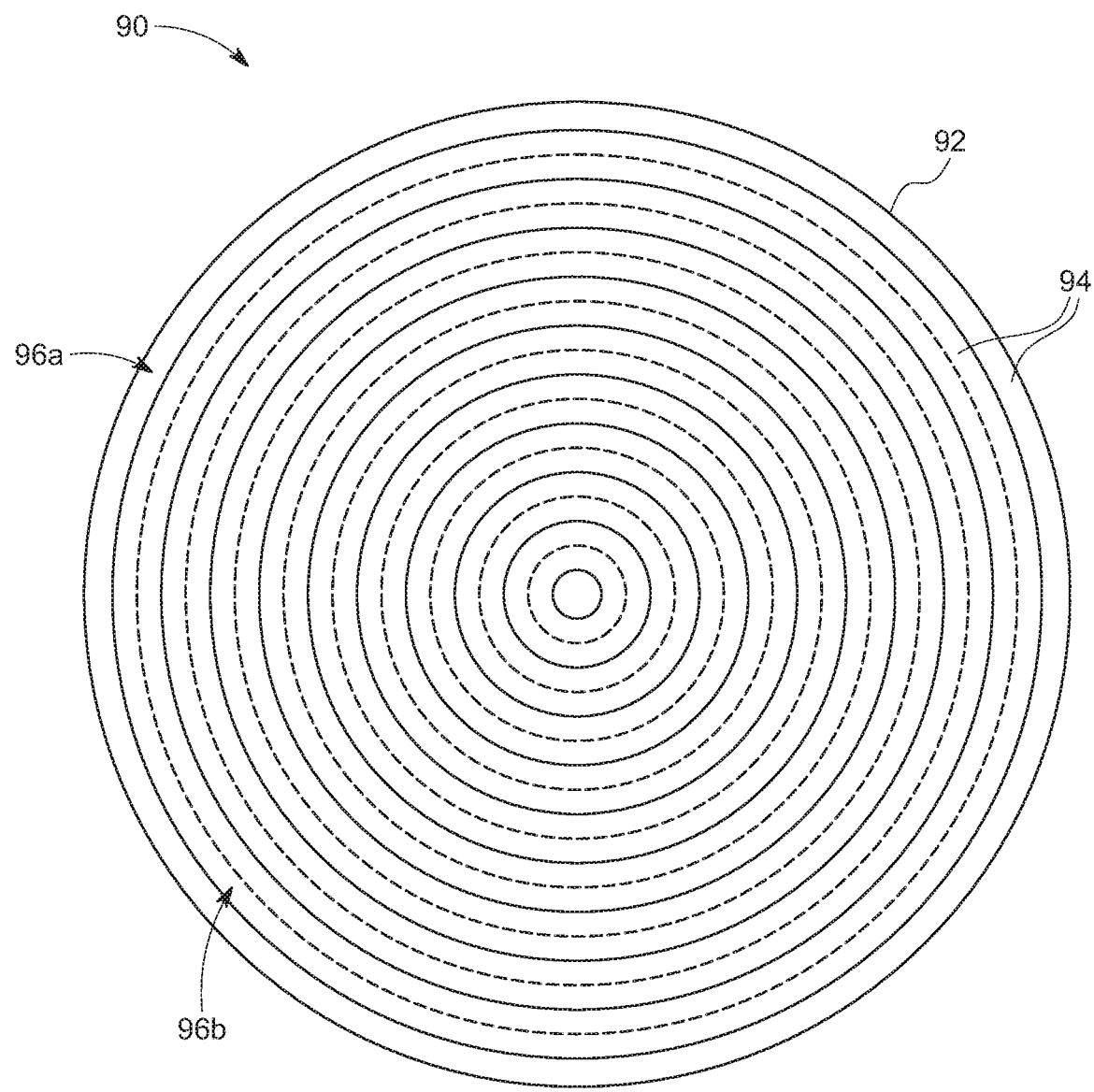
FIG. 29 provides a schematic view of a crease or fold pattern for a multiple curve structure, according to an exemplary embodiment of the present subject matter.
Figure 30:
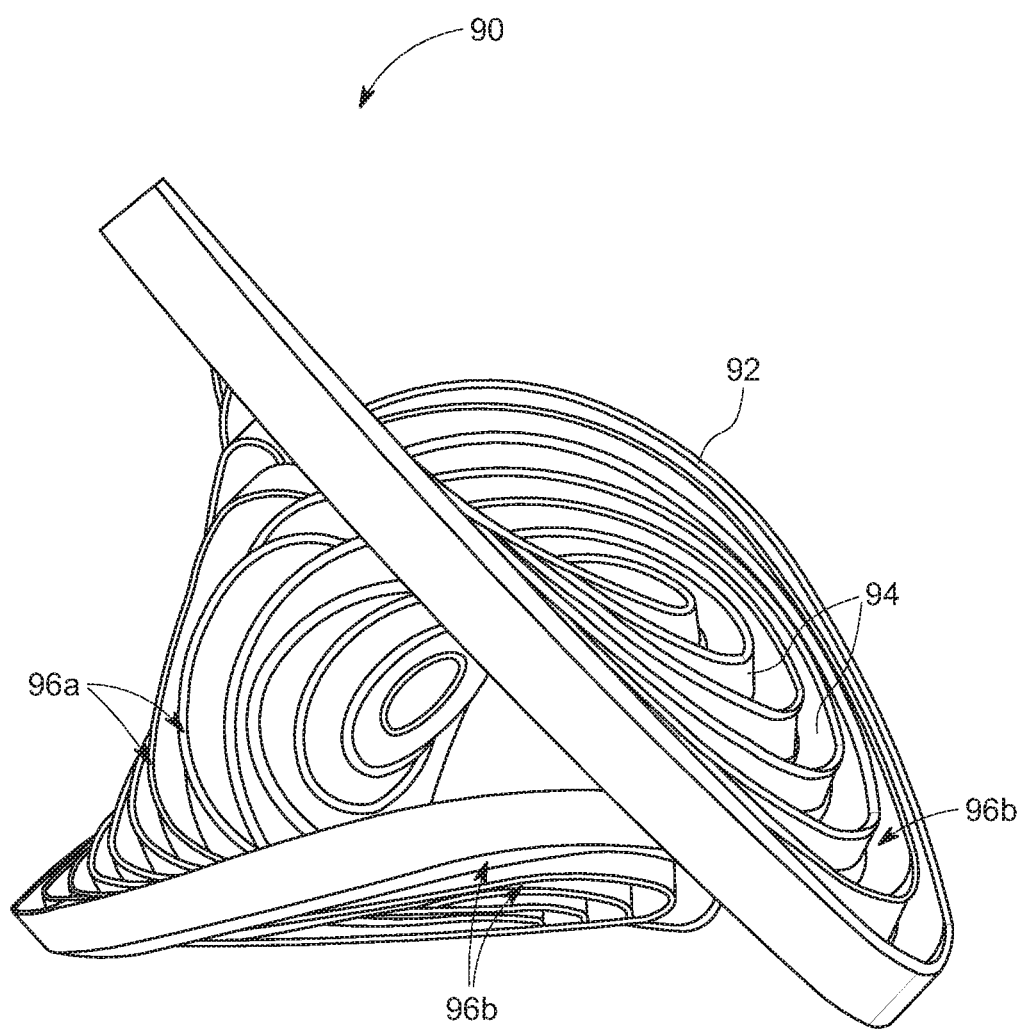
FIG. 30 provides a side perspective view of a multiple curve structure formed by folding at least one generally flat or planar sheet of composite material using the pattern of FIG. 29, according to an exemplary embodiment of the present subject matter.

Turning to FIGS. 29 and 30, the present subject matter also encompasses multiple curve foldable structures. A multiple curve structure 90 is a structure having multiple axes about which the structure curves. The exemplary multiple curve structure 90 of FIGS. 29 and 30 may be deployed without any scaffolding, like the arch structure 40 and saddle structure 80. Also, the multiple curve structure 90 may be positioned in multiple configurations. For example, the structure 90 may be "frozen" or fixed (temporarily or permanently) into a particular pose or configuration. Tensile cables, clamps and blocks, and/or other elements may be used to pull or push the foldable structure 90 into the particular configuration, especially if asymmetry is desired. In the exemplary embodiment of FIGS. 29 and 30, the structure 90 comprises twenty concentric circles, which allows the structure 90 to have multiple degrees of freedom. In other embodiments in which the structure 90 comprises fewer concentric circles, the degrees of freedom may be reduced, e.g., a structure 90 comprising six concentric circles may be forced to more closely follow a saddle geometry.

Further, similar to the column structures 10, the arch structure 40, and the panel 70, the multiple curve structure 90 may be formed from one or more sheets 92 of a composite material, e.g., a textile-based composite such as a fiber-reinforced-polymer (FRP) where the reinforcing fibers are glass, carbon, or any other suitable reinforcing material. As shown in FIG. 29, the multiple curve structure 90 comprises a plurality of surface segments 94 with hinges 96 between adjacent surface segments 94. The surface segments 94 define surfaces of the structure 90 between hinges 96. As shown most clearly in FIG. 30, the hinges 96 form either peaks 96a or valleys 96b. Moreover, the surface segments 94 may be developable planes, having zero-Gaussian curvature, while the hinges 86 may have curvature. It will be appreciated that the multiple curve structure 90 may be fabricated using a similar method or process (e.g., laying out the dry material, selectively applying a rigidifying substance, folding along the hinges 96, applying additional coating(s)) as described with respect to the fabrication of the column structure 10, arch structure 40, and panel 70.

Thus, as illustrated and described with respect to, e.g., the saddle structure 80 and the multiple curve structure 90, foldable composite structures as described herein could be folded along curved creases or folds. For example, using the selective coating fabrication technique described herein, where a rigidifying material is selectively applied to a sheet of composite material to define hinges or creases along which the materials is folded, fiberglass or carbon fiber could fold along curved creases. Folding along curved creases or folds allows structures to have developable planes and have Gaussian curvature globally, e.g., such as the saddle geometry described with respect to FIGS. 27 and 28 and the geometry described with respect to FIGS. 29 and 30.

It will be understood that any suitable fiber reinforcement material, such as fiber reinforcement fabrics including composite laminates, may be used to form a folded composite structure. For example, as described elsewhere herein, glass or carbon reinforced fabrics may be used, as well as fiberglass chopped strand mat, a non-crimp reinforcement such as a cross-stitched fabric, or a sheet of material where one side is woven or cross-stitched and the opposite side is a chopped strand mat. In some embodiments, a core material may be sandwiched between laminate layers to form the segments between the hinges of the structure (e.g., surface segments 14, 44, 74, 84, 94), thereby increasing the stiffness of the laminate (by increasing its thickness) as well as providing shear strength. A low-density core material, such as foam or balsa wood, or a honeycomb or similar structure can provide a significant increase in stiffness without a significant increase in weight. Exemplary core materials include thermoplastic foams such as polyurethane and polyvinylchloride (PVC) foams, honeycombs made from a variety of materials, woods such as cedar and balsa, and fabric-like materials such as non-woven felt-like fabrics having hollow portions that reduce their density. Core materials may reduce or eliminate the need for any on-site scaffolding for erection of the folded composite structure.

Moreover, a folded composite structure as described herein may be formed from one or more sheets of composite material that comprise a combination of multiple types of fiber reinforcement, and the foldable composite structures of the present subject matter do not need to maintain the same material properties throughout. More particularly, excluding specific shell structures, the distribution of principal stresses along a surface tend to vary drastically. As a result, it is common for the material thickness to vary in response to bending moments. For example, a surface will usually thicken when anchoring to the ground or feather when reaching a cantilever. Thus, the thickness of the material forming the composite structure may vary throughout the structure. Additionally or alternatively, the composite structure may comprise a hybrid of reinforcement materials. For instance, the composite material may be any combination of glass and carbon fiber or other FRP, where carbon fiber is used only at specific locations of the structure and fiberglass, e.g., is used elsewhere in the structure. In such embodiments, the benefits of the carbon fiber reinforced material (e.g., greater compression strength compared to fiberglass) are utilized where needed, while the negatives of carbon fiber (e.g., it is heavier and more expensive than fiberglass) are minimized. Any suitable combination of reinforcement materials may be used in the composite sheet(s) used to form a folded composite structure to provide a needed function at a specific location. Still further, after the composite structure is deployed onsite, additional layers or sheets 12 of fiber reinforcement fabric may be applied or laminated on top of the folded composite structure, increasing the material thickness, if and where needed. The additional layers may strengthen the structure, e.g., to resist various stresses, forces, and/or moments acting on the structure. Thus, the composite structure need not have the same cross-section, in terms of thickness, material composition, etc., throughout the structure.

Additionally or alternatively, materials such concrete, cob (also referred to as cobb or clom), or the like, may be used with foldable composite structures according to the present subject matter. For instance, a folded composite column structure 10 could be used as a temporary and/or reusable formwork for concrete columns. More particularly, instead of adhering together overlapping strips of a column structure 10, or otherwise securing the folded composite sheet 12 to define the 3D the column structure 10 as described herein, an alternative connection (such as a hook and loop closure, clips, or other temporary fasteners) could be used to allow the system to be reused. In such embodiments, the hinges 16 of the column structure 10 may be covered with, e.g., silicone to allow them to remain flexible and impermeable to water. Once the concrete is poured and cured, with the column structure 10 providing the form for the concrete, the column structure 10 may be removed and reused, e.g., to form additional concrete columns. Of course, other foldable composite structures as described herein may be used as reusable frameworks for other types of concrete structures.

In other exemplary embodiments, a folded composite column structure 10 could be used as a stay-in-place formwork for a concrete column, which is an additional tensile reinforcement for the concrete. More particularly, the composite material (e.g., fiberglass or another material as described herein) of the column structure 10 may be used as a tensile reinforcement for the concrete. For example, concrete columns occasionally are wrapped with fiberglass after they have been installed. In exemplary embodiments, the process may be reversed, such that the concrete is poured in place into the foldable composite formwork that remains in place with the concrete. Additionally or alternatively, this technique could also be used for a roof or floor system or other concrete structure. The folded composite structure, such as panels 70, could be clipped into place at the corners of the roof or floor system such that concrete can be poured into place, and the composite structure remains in place to provide tensile reinforcement to the concrete roof or floor system.

In still other exemplary embodiments, instead of casting the concrete directly on top of a folded composite structure, the concrete could be cast between two folded surfaces of the composite structure. For instance, concrete could be cast between adjacent segments 44 of an arch structure 40, between two wall panels 70, or between two offset column structures 10, e.g., to form a hollow column 10. In yet other embodiments, the folded composite structure, such as a column structure 10, a roof panel 70, and/or a wall panel 70, could be sprayed with concrete, creating a thin rigid structure. Of course, other materials than concrete and other ways of integrating folded composite structures or utilizing folded composite structures with materials such as concrete may be used as well.

Additionally, although generally described as utilizing an open curing process, in other embodiments, the fabrication processes could utilize vacuum bagging, e.g., to improve the surface finish of the composite structure. For instance, the sheet of composite material (e.g., sheet 12, sheet 42, sheet 72, sheet 82, or sheet 92) could be vacuum bagged after the selective application of the polymer (e.g., polymer 22, polymer 52, or polymer 73) for curing. Moreover, substances such as Bondo® by 3M or the like may be applied to the surfaces of the composite structure in either its flat state or erect position. Further, it will be appreciated that, for many of the described embodiments, after erecting or deploying a composite structure from its generally planar, flat-packed state as described herein, the composite structure may be returned to the planar state for transportation, storage, etc. Other variations of the composite structures and the methods described herein for fabricating composite structures also may be utilized.

Accordingly, as described herein, a seemingly infinite number of three-dimensional composite structures may be formed from flat or planar sheets of composite material without requiring a mold for each unique structure, thereby reducing the cost of fabricating unique parts. Moreover, fabricating 3D composite structures without a mold can reduce the time required to manufacture the composite structures because no mold must be made and the structures can be fabricated onsite. In some embodiments, using the techniques described herein, composite structures may be made from a single sheet of composite material, such that no fasteners are required to fabricate the composite structures. In other embodiments, composite structures may be fabricated as described herein without requiring separate fasteners; for example, the polymer used to rigidify a fabric composite material to form a 3D composite structure also may be used to join adjacent sheets of the composite material fabric. Thus, the composite structures described herein have fewer parts or pieces, which can reduce their cost and complexity of assembly, and increased structural integrity. Moreover, the foldable composite structures described herein may reduce manufacturing costs through a reduction in production time and reduced or eliminated material waste.

Further, composite structures fabricated using the folding techniques described herein have a generally flat or compressed state, referred to herein as a flat pack configuration, that allows the composite structures to be transported to a site in the generally flat or compressed state, which can reduce transportation time, costs, and complexity. Thus, the foldable composite structures described herein generally have a high portability. The composite structures also may be stored in the generally flat or compressed state, which can reduce storage costs and complexity. Additionally or alternatively, the present subject matter promotes the design of stronger lightweight structures. Foldable composite structures as described herein may have numerous potential applications ranging from architecture, packaging, and product design to the aerospace and automotive industries. As an example, the foldable composite structures described herein may be used as onsite deployable structures, e.g., for disaster relief. As other examples, crease patterns for foldable composite structures as described herein may be used to fabricate automotive body parts and/or to create dimpled surfaces (e.g., using curved creases) to improve aerodynamics. Other advantages of the subject matter described herein also may be realized by those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for fabricating a composite structure, comprising:
selectively applying a rigidifying substance to a sheet of composite material to define a plurality of hinges;
allowing the rigidifying substance to cure;
folding the sheet of composite material along the hinges to form a planar flat pack; and
unfolding the planar flat pack into the composite structure, the composite structure being three-dimensional,
wherein unfolding the planar flat pack into the composite structure comprises folding the sheet of composite material along the hinges to form the three-dimensional composite structure.

2. The method of claim 1, wherein the composite material is a textile-based composite.

3. The method of claim 1, wherein the composite material is a fiber-reinforced-polymer (FRP).

4. The method of claim 3, wherein the composite material is a dry fiber reinforcement fabric.

5. The method of claim 1, further comprising:
applying a masking material to the sheet of composite material before applying the rigidifying substance; and
removing the masking material before folding the sheet of composite material.

6. The method of claim 1, wherein allowing the polymer to cure comprises curing the rigidifying substance over time at ambient temperature.

7. The method of claim 1, further comprising:
applying a coating to the hinges after the planar flat pack is unfolded to form the composite structure.

8. The method of claim 1, wherein the rigidifying substance is selectively applied using a printer.

9. The method of claim 1, wherein the rigidifying substance is selectively applied by a robotic arm of an automated machine.

10. The method of claim 1, wherein unfolding the planar flat pack comprises defining a plurality of surface segments with the hinges between adjacent surface segments, the plurality of surface segments forming the composite structure.

11. The method of claim 1, further comprising:
returning the three-dimensional composite structure to the planar flat pack.

12. A method for fabricating a composite structure, comprising:
laying out flat a sheet of composite material;
masking a plurality of locations of hinges on the sheet of composite material using a masking material;
applying a polymer to a face of the sheet of composite material;
curing the polymer;
removing the masking material; and
folding the sheet of composite material along the hinges to form the composite structure,
wherein the composite structure is a structural building component,
wherein the hinges are curved, and
wherein the composite structure has a non-zero Gaussian curvature.

13. The method of claim 12, further comprising:
folding the composite structure into a flat pack configuration to transport the composite structure.

14. The method of claim 12, further comprising:
joining the sheet of composite material with a second sheet of composite material.

15. The method of claim 12, further comprising:
applying a coating to the composite structure after the sheet of composite material is folded to form the composite structure.

16. The method of claim 12, wherein the composite structure is a reusable framework for a concrete structure.

17. The method of claim 12, wherein the composite structure is a stay-in-place framework for a concrete structure.

18. The method of claim 12, further comprising:
spraying one or more surfaces of the composite structure with concrete.

19. A method for fabricating a composite structure, comprising:
laying out flat a sheet of composite material;
masking a plurality of locations of hinges on the sheet of composite material using a masking material;
applying a polymer to a face of the sheet of composite material;
curing the polymer;
removing the masking material;
folding the sheet of composite material along the hinges to form the composite structure; and
spraying one or more surfaces of the composite structure with concrete,
wherein the composite structure is a structural building component.

* * * * *